US009684856B2

(12) United States Patent
Suzuki

(10) Patent No.: US 9,684,856 B2
(45) Date of Patent: Jun. 20, 2017

(54) METHOD, CONTROL DEVICE AND NON-TRANSITORY COMPUTER-READABLE STORAGE MEDIUM STORING PROGRAM FOR ESTIMATING COLOR VERIFICATION RESULT

(71) Applicant: KONICA MINOLTA, INC., Chiyoda-ku, Tokyo (JP)

(72) Inventor: Naoyo Suzuki, Tama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/040,759

(22) Filed: Feb. 10, 2016

(65) Prior Publication Data
US 2016/0239728 A1    Aug. 18, 2016

(30) Foreign Application Priority Data
Feb. 17, 2015 (JP) ................................. 2015-028428

(51) Int. Cl.
*H04N 1/00* (2006.01)
*H04N 1/60* (2006.01)
*G06K 15/02* (2006.01)
*G06F 3/12* (2006.01)

(52) U.S. Cl.
CPC ......... *G06K 15/027* (2013.01); *G06F 3/1208* (2013.01); *G06F 3/1229* (2013.01); *G06K 15/1868* (2013.01); *G06K 15/1878* (2013.01); *H04N 1/0009* (2013.01); *H04N 1/00015* (2013.01); *H04N 1/00023* (2013.01); *H04N 1/00034* (2013.01); *H04N 1/00045* (2013.01); *H04N 1/00068* (2013.01);
(Continued)

(58) Field of Classification Search
CPC ........................... G06K 15/027; H04N 1/6033
See application file for complete search history.

(56) References Cited

U.S. PATENT DOCUMENTS

| 8,311,321 | B2 * | 11/2012 | Horita | H04N 1/603 358/1.9 |
| 8,373,897 | B2 * | 2/2013 | Horita | H04N 1/603 358/1.9 |
| 9,286,818 | B2 * | 3/2016 | Asanuma | G09G 3/006 |

(Continued)

FOREIGN PATENT DOCUMENTS

JP            2011061544 A       3/2011

*Primary Examiner* — Scott A Rogers
(74) *Attorney, Agent, or Firm* — Holtz, Holtz & Volek PC

(57) ABSTRACT

A control device estimates a color verification result by using the following method. The method includes obtaining a first set of color values by using measurements of a color chart printed by a printer without color management; calculating second and third sets of color values based on increased color gamut and reduced color gamut of the printer due to a conditional change of the printer; creating a first to third printer-profiles by using the first to third sets of color values; calculating theoretical reference values of target color values and first to third theoretical color values by using the first to third printer-profiles; calculating first to third color differences by using the theoretical reference values and the first to third theoretical color values; obtaining an estimated result of the color verification by comparing the first to third color differences with a preset standard value; and outputting the estimated result.

21 Claims, 20 Drawing Sheets

(52) U.S. Cl.
CPC ....... *H04N 1/00092* (2013.01); *H04N 1/6008* (2013.01); *H04N 1/6033* (2013.01); *H04N 1/6097* (2013.01)

(56) References Cited

U.S. PATENT DOCUMENTS

| | | | | |
|---|---|---|---|---|
| 9,332,158 | B2* | 5/2016 | Mori | H04N 1/6033 |
| 2009/0086290 | A1* | 4/2009 | Ming | H04N 1/6033 |
| | | | | 358/501 |
| 2010/0259794 | A1* | 10/2010 | Purdum | H04N 1/00002 |
| | | | | 358/3.06 |
| 2010/0328691 | A1* | 12/2010 | Hoshino | H04N 1/6055 |
| | | | | 358/1.9 |
| 2011/0058195 | A1 | 3/2011 | Kano | |
| 2014/0247469 | A1* | 9/2014 | Mestha | H04N 1/6052 |
| | | | | 358/3.23 |
| 2014/0313528 | A1* | 10/2014 | Suzuki | G06K 15/027 |
| | | | | 358/1.9 |

* cited by examiner

FIG. 16A

| PROBABILITY WITH RESPECT TO CENTER VALUE (REF. VALUE) OF ALL VALUES OF DEVICE VARIATION | | C100% | M100% | Y100% | R100% | G100% | B100% | K100% | OVERALL JUDGEMENT RESULT | ESTIMATED ACCEPTANCE RATIO |
|---|---|---|---|---|---|---|---|---|---|---|
| UPPER LIMIT SIDE (COLOR GAMUT INCREASING SIDE) | 49.9% | OK | OK | NG | OK | OK | OK | NG | NG | 50.0% |
| | 45.0% | OK | OK | OK | OK | OK | OK | NG | NG | |
| | 40.0% | OK | OK | OK | OK | OK | OK | NG | NG | |
| | 35.0% | OK | OK | OK | OK | OK | OK | NG | NG | |
| | 30.0% | OK | OK | OK | OK | OK | OK | OK | OK | |
| | 25.0% | OK | OK | OK | OK | OK | OK | OK | OK | |
| | 20.0% | OK | OK | OK | OK | OK | OK | OK | OK | |
| | 15.0% | OK | OK | OK | OK | OK | OK | OK | OK | |
| | 10.0% | OK | OK | OK | OK | OK | OK | OK | OK | |
| | 5.0% | OK | OK | OK | OK | OK | OK | OK | OK | |
| REF. VALUE | | OK | OK | OK | OK | OK | OK | OK | OK | |
| LOWER LIMIT SIDE (COLOR GAMUT REDUCING SIDE) | 5.0% | OK | OK | OK | OK | OK | OK | OK | OK | |
| | 10.0% | OK | OK | OK | OK | OK | OK | OK | OK | |
| | 15.0% | OK | OK | OK | OK | OK | OK | OK | OK | |
| | 20.0% | OK | OK | OK | OK | OK | OK | OK | OK | |
| | 25.0% | NG | NG | NG | NG | OK | OK | OK | NG | |
| | 30.0% | NG | NG | NG | NG | NG | NG | OK | NG | |
| | 35.0% | NG | NG | NG | NG | NG | NG | NG | NG | |
| | 40.0% | NG | NG | NG | NG | NG | NG | NG | NG | |
| | 45.0% | NG | NG | NG | NG | NG | NG | NG | NG | |
| | 49.9% | NG | NG | NG | NG | NG | NG | NG | NG | |

FIG. 16B

| PROBABILITY WITH RESPECT TO CENTER VALUE (REF. VALUE) OF ALL VALUES OF DEVICE VARIATION | | C100% | M100% | Y100% | R100% | G100% | B100% | K100% | OVERALL JUDGEMENT RESULT | ESTIMATED ACCEPTANCE RATIO |
|---|---|---|---|---|---|---|---|---|---|---|
| UPPER LIMIT SIDE (COLOR GAMUT INCREASING SIDE) | 49.9% | OK | OK | NG | OK | OK | OK | NG | NG | 75.0% |
| | 45.0% | OK | OK | OK | OK | OK | OK | NG | NG | |
| | 40.0% | OK | OK | OK | OK | OK | OK | OK | OK | |
| | 35.0% | OK | OK | OK | OK | OK | OK | OK | OK | |
| | 30.0% | OK | OK | OK | OK | OK | OK | OK | OK | |
| | 25.0% | OK | OK | OK | OK | OK | OK | OK | OK | |
| | 20.0% | OK | OK | OK | OK | OK | OK | OK | OK | |
| | 15.0% | OK | OK | OK | OK | OK | OK | OK | OK | |
| | 10.0% | OK | OK | OK | OK | OK | OK | OK | OK | |
| | 5.0% | OK | OK | OK | OK | OK | OK | OK | OK | |
| REF. VALUE | | OK | OK | OK | OK | OK | OK | OK | OK | |
| | 5.0% | OK | OK | OK | OK | OK | OK | OK | OK | |
| | 10.0% | OK | OK | OK | OK | OK | OK | OK | OK | |
| | 15.0% | OK | OK | OK | OK | OK | OK | OK | OK | |
| | 20.0% | OK | OK | OK | OK | OK | OK | OK | OK | |
| | 25.0% | OK | OK | OK | OK | OK | OK | OK | OK | |
| LOWER LIMIT SIDE (COLOR GAMUT REDUCING SIDE) | 30.0% | OK | OK | OK | OK | OK | OK | OK | OK | |
| | 35.0% | OK | OK | OK | OK | OK | OK | OK | OK | |
| | 40.0% | NG | NG | NG | NG | NG | NG | NG | NG | |
| | 45.0% | NG | NG | NG | NG | NG | NG | NG | NG | |
| | 49.9% | NG | NG | NG | NG | NG | NG | NG | NG | |

FIG. 16C

| PROBABILITY WITH RESPECT TO CENTER VALUE (REF. VALUE) OF ALL VALUES OF DEVICE VARIATION | | C100% | M100% | Y100% | R100% | G100% | B100% | K100% | OVERALL JUDGEMENT RESULT | ESTIMATED ACCEPTANCE RATIO |
|---|---|---|---|---|---|---|---|---|---|---|
| UPPER LIMIT SIDE (COLOR GAMUT INCREASING SIDE) | 49.9% | OK | OK | OK | OK | OK | OK | NG | NG | 90.0% |
| | 45.0% | OK | OK | OK | OK | OK | OK | OK | OK | |
| | 40.0% | OK | OK | OK | OK | OK | OK | OK | OK | |
| | 35.0% | OK | OK | OK | OK | OK | OK | OK | OK | |
| | 30.0% | OK | OK | OK | OK | OK | OK | OK | OK | |
| | 25.0% | OK | OK | OK | OK | OK | OK | OK | OK | |
| | 20.0% | OK | OK | OK | OK | OK | OK | OK | OK | |
| | 15.0% | OK | OK | OK | OK | OK | OK | OK | OK | |
| | 10.0% | OK | OK | OK | OK | OK | OK | OK | OK | |
| | 5.0% | OK | OK | OK | OK | OK | OK | OK | OK | |
| REF. VALUE | | | | | | | | | | |
| | 5.0% | OK | OK | OK | OK | OK | OK | OK | OK | |
| | 10.0% | OK | OK | OK | OK | OK | OK | OK | OK | |
| | 15.0% | OK | OK | OK | OK | OK | OK | OK | OK | |
| | 20.0% | OK | OK | OK | OK | OK | OK | OK | OK | |
| | 25.0% | OK | OK | OK | OK | OK | OK | OK | OK | |
| | 30.0% | OK | OK | OK | OK | OK | OK | OK | OK | |
| LOWER LIMIT SIDE (COLOR GAMUT REDUCING SIDE) | 35.0% | OK | OK | OK | OK | OK | OK | OK | OK | |
| | 40.0% | OK | OK | OK | OK | OK | OK | OK | OK | |
| | 45.0% | OK | OK | OK | OK | OK | OK | OK | OK | |
| | 49.9% | NG | NG | NG | NG | NG | NG | NG | NG | |

FIG. 16D

| PROBABILITY WITH RESPECT TO CENTER VALUE (REF. VALUE) OF ALL VALUES OF DEVICE VARIATION | | C100% | M100% | Y100% | R100% | G100% | B100% | K100% | OVERALL JUDGEMENT RESULT | ESTIMATED ACCEPTANCE RATIO |
|---|---|---|---|---|---|---|---|---|---|---|
| UPPER LIMIT SIDE (COLOR GAMUT INCREASING SIDE) | 49.9% | OK | OK | OK | OK | OK | OK | OK | OK | 99.8% |
| | 45.0% | OK | OK | OK | OK | OK | OK | OK | OK | |
| | 40.0% | OK | OK | OK | OK | OK | OK | OK | OK | |
| | 35.0% | OK | OK | OK | OK | OK | OK | OK | OK | |
| | 30.0% | OK | OK | OK | OK | OK | OK | OK | OK | |
| | 25.0% | OK | OK | OK | OK | OK | OK | OK | OK | |
| | 20.0% | OK | OK | OK | OK | OK | OK | OK | OK | |
| | 15.0% | OK | OK | OK | OK | OK | OK | OK | OK | |
| | 10.0% | OK | OK | OK | OK | OK | OK | OK | OK | |
| | 5.0% | OK | OK | OK | OK | OK | OK | OK | OK | |
| REF. VALUE | | OK | OK | OK | OK | OK | OK | OK | OK | |
| | 5.0% | OK | OK | OK | OK | OK | OK | OK | OK | |
| | 10.0% | OK | OK | OK | OK | OK | OK | OK | OK | |
| | 15.0% | OK | OK | OK | OK | OK | OK | OK | OK | |
| | 20.0% | OK | OK | OK | OK | OK | OK | OK | OK | |
| | 25.0% | OK | OK | OK | OK | OK | OK | OK | OK | |
| LOWER LIMIT SIDE (COLOR GAMUT REDUCING SIDE) | 30.0% | OK | OK | OK | OK | OK | OK | OK | OK | |
| | 35.0% | OK | OK | OK | OK | OK | OK | OK | OK | |
| | 40.0% | OK | OK | OK | OK | OK | OK | OK | OK | |
| | 45.0% | OK | OK | OK | OK | OK | OK | OK | OK | |
| | 49.9% | OK | OK | OK | OK | OK | OK | OK | OK | |

FIG. 17

| ESTIMATED ACCEPTANCE RATIO | JUDGEMENT LEVEL |
|---|---|
| 99.8% | |
| 95% | LAX |
| 90% | |
| 85% | |
| 80% | |
| 75% | MIDDLE |
| 70% | |
| 65% | |
| 60% | STRICT |

FIG. 18

| DEVICE TYPE | PAPER TYPE | TARGET | JUDGEMENT LEVEL | RESULT | VERIFICATION DATE |
|---|---|---|---|---|---|
| | | | | | |
| | | | | | |
| | | | | | |
| | | | | | |
| | | | | | |
| | | | | | |
| | | | | | |
| | | | | | |

| LEVEL SELECTION | JUDGEMENT LEVEL (TOLERANCE OF DEVICE VARIATION) | RESULT OF COLOR VERIFICATION (ESTIMATED) |
|---|---|---|
| ○ | LAX | ACCEPTABLE |
| ○ | MEDIUM | ACCEPTABLE |
| ◉ | STRICT | UNACCEPTABLE |

Judgement level which can make the result UNACCEPTABLE is now selected.
Selecting MEDIUM judgement level is recommended.

| LEVEL SELECTION | JUDGEMENT LEVEL (TOLERANCE OF DEVICE VARIATION) | RESULT OF COLOR VERIFICATION (ESTIMATED) | |
|---|---|---|---|
| ○ | LAX | UNACCEPTABLE | |
| ○ | MEDIUM | UNACCEPTABLE | |
| ◉ | STRICT | UNACCEPTABLE | |
| ○ | CUSTOM | | DETAILS |

Judgement level which can make the result UNACCEPTABLE is now selected.
Changing the judgement standard for the UNACCEPTABLE item is recommended.
To change the judgement standard, select CUSTOM judgement level and click DETAILS button.

FIG. 22

| JUDGEMENT ITEMS | JUDGEMENT LEVEL | | | JUDGEMENT STANDARD | | CUSTOM SETTINGS | |
|---|---|---|---|---|---|---|---|
| | TOLERANCE: STRICT | TOLERANCE: MEDIUM | TOLERANCE: LAX | CURRENT | RECOM-MENDED | CHANGE | VALUE |
| C100% | ΔE=2.5 | ΔE=3 | ΔE=4 | ΔE≦5 | ΔE≦5 | | |
| M100% | ΔE=2.5 | ΔE=3 | ΔE=4 | ΔE≦5 | ΔE≦5 | | |
| Y100% | ΔE=2.5 | ΔE=3 | ΔE=4 | ΔE≦5 | ΔE≦5 | | |
| R100% | ΔE=2.5 | ΔE=3 | ΔE=4 | ΔE≦5 | ΔE≦5 | | |
| G100% | ΔE=2.5 | ΔE=3 | ΔE=4 | ΔE≦5 | ΔE≦5 | | |
| B100% | ΔE=2.5 | ΔE=3 | ΔE=4 | ΔE≦5 | ΔE≦5 | | |
| K100% | ΔE=6.0 | ΔE=6.5 | ΔE=7.5 | ΔE≦5 | ΔE≦8 | ☑ | 8 |

63

METHOD, CONTROL DEVICE AND NON-TRANSITORY COMPUTER-READABLE STORAGE MEDIUM STORING PROGRAM FOR ESTIMATING COLOR VERIFICATION RESULT

The entire disclosure of Japanese Patent Application No. 2015-028428 filed on Feb. 17, 2015 including description, claims, drawings, and abstract are incorporated herein by reference in its entirety.

TECHNICAL FIELD

The present invention relates to a method, a control device and a non-transitory computer-readable storage medium storing a program, for estimating a color verification result. In particular, the present invention relates to a method of estimating a result of color verification, a control device which executes color verification, and non-transitory computer-readable storage medium storing a program, to be executed in the control device, for estimating a result of color verification.

BACKGROUND

Color verification, judging the accuracy of color reproduction, is performed on printed colors when an image forming apparatus prints using a new type of paper. To conduct the color verification, for example, a color image forming apparatus outputs a color chart without color management (including color space conversion), the output color chart is measured by a color measurement instrument, and a printer profile is created by using data of the measured colors. Successively, after color management has been performed by using the created printer profile (alternatively, if the printer profile has been created beforehand, by using the given printer profile), the color image forming apparatus outputs a color chart again, the output color chart is measured by the color measurement instrument, and color verification is made by using data of the measured colors. If a verification result indicating unacceptable color reproduction accuracy is obtained, the color image forming apparatus executes color calibration using its color calibration function, and outputs a color chart again. Then, until a verification result indicating acceptable color reproduction accuracy is obtained, output of a color chart, color measurement, and color calibration are executed repeatedly.

DESCRIPTION OF THE RELATED ART

With regard to such color verification, for example, Japanese Unexamined Patent Application Publication (JP-A) No. 2011-061544 (corresponding to US Patent Application Publication No. US2011/0058195A1) discloses a color information processing apparatus that includes a color information processor, a result display controller and a color history display controller. The color information processor executes a series of multiple steps to make a color actually printed by a printing device approximate to or coincide with a designated color. The result display controller displays an execution result for each of the multiple steps. The color history display controller displays plural colors acquired in the steps, as a history of changes of the designated color. Further, JP-A No. 2011-061544 discloses the following matters. The color information processing section executes a step of acquiring the designated color. The color information processing section further executes a step of, if the designated color is out of the gamut of the printing device, acquiring the designated color mapped inside the gamut, as a reference color; if the designated color is inside of the gamut of the printing device, setting the designated color as a reference color; and then creating image data of a first color chart. The first color chart includes plural color patches having different lightness values and chromaticity values of their color space, centering around the lightness value and chromaticity value of the reference color. The color information processing section further executes a step of measuring the first color chart printed by the printing device on the basis of the image data, and acquiring thereby the printed reference color and a first color selected by a user. The color history display controller displays a history of changes of the designated color, the reference color, the reference color measured, and the first color.

In the disclosed technique, the probability that printed colors acceptably close to desired colors are realized by just one-time execution of color calibration is slight. To obtain acceptable printed colors, there is a need of a repetition of color calibration over and over so as to bring the printed colors close to desired colors. In view of that, in order to allow a user to perceive color changes easily, the technique of JP-A No. 2011-061544 employs the color information processing apparatus which displays details of a history of colors adjusted to obtain an adjusted color. In the disclosed technique, calculation of color differences of the reference color and the adjusted color with respect to the designated color needs actual output of a color chart and data of measured colors of the color chart. If an obtained adjusted color is not acceptable to a user, an additional operation to output a color chart and to measure the output color chart needs to be performed repeatedly.

In other words, according to the conventional technique, in the case where a color verification result indicating unacceptable color accuracy is obtained even after color calibration is executed by using the color calibration function of the apparatus, it is necessary to output a color chart many times and to measure the output color chart each time. It results in a wasteful use of consumption materials, such as paper sheets and coloring materials and occurrence of excessive processes, such as output of a color chart and color measurement of the color chart, relating to the color verification.

SUMMARY

Aspects of the present invention are directed to methods of estimating a result of color verification, control devices, and non-transitory computer-readable storage media each storing a program for estimating a result of color verification.

A method reflecting one aspect of the present invention is a method used by a control device which performs color verification of colors printed by a printer, for estimating a result of the color verification, where the color verification is judging of color reproduction accuracy of the printer. The method comprises causing a user to input conditions to be used for the color verification, through an input unit of the control device; and obtaining a first set of color values being measured color values of color patches of a color chart printed by the printer without color management. The method further comprises calculating a second set of color values and a third set of color values, where the second set of color values correspond to the first set of color values and represent colors to be printed by the printer having a color gamut increased with a conditional change of the printer, and the third set of color values correspond to the first set of color values and represent colors to be printed by the printer having a color gamut reduced with a conditional change of the printer. The method further comprises creating a first printer-profile, a second printer-profile and a third printer-profile by using the first set of color values, the second set of color values and the third set of color values. The method further comprises, on a basis of the conditions input by the user, calculating theoretical reference values of color values of a target of the color verification, by using a predetermined target profile. The method further comprises calculating first theoretical color values, second theoretical color values and third theoretical color values from the theoretical reference values by using the first to third printer-profiles. The method further comprises obtaining an estimated result of the color verification on a basis of comparison between a preset standard value and each of first to third color differences, where the first to third color difference each represents a difference between the theoretical reference values and corresponding one of the first theoretical color values, the second theoretical color values and the third theoretical color values. The method further comprises outputting the estimated result through the output unit of the control device.

A control device reflecting one aspect of the present invention is a control device which performs color verification of colors printed by a printer, where the color verification is judging of color reproduction accuracy of the printer. The control device comprises: an input unit; an output unit; and an estimation section that estimates a result of color verification and performs following processing. The processing includes causing a user to input conditions to be used for the color verification, through the input unit, and obtaining a first set of color values being measured color values of color patches of a color chart printed by the printer without color management. The processing further includes calculating a second set of color values and a third set of color values, where the second set of color values correspond to the first set of color values and represent colors to be printed by the printer having a color gamut increased with a conditional change of the printer, and the third set of color values correspond to the first set of color values and represent colors to be printed by the printer having a color gamut reduced with a conditional change of the printer. The processing further includes creating a first printer-profile, a second printer-profile and a third printer-profile by using the first set of color values, the second set of color values and the third set of color values. The processing further includes, on a basis of the conditions input by the user, calculating theoretical reference values of color values of a target of the color verification, by using a predetermined target profile. The processing further includes calculating first theoretical color values, second theoretical color values and third theoretical color values from the theoretical reference values by using the first to third printer-profiles. The processing further includes obtaining an estimated result of the color verification on a basis of comparison between a preset standard value and each of first to third color differences, where the first to third color difference each represents a difference between the theoretical reference values and corresponding one of the first theoretical color values, the second theoretical color values and the third theoretical color values. The processing further includes outputting the estimated result through the output unit.

An non-transitory computer-readable storage medium reflecting one aspect of the present invention stores a program to be executed by a control device which performs color verification of colors printed by a printer, for estimating a result of the color verification, where the color verification is judging of color reproduction accuracy of the printer. The program, when executed by a processor of the control device, causes the control device to perform the following processing. The processing comprises causing a user to input conditions to be used for the color verification, through an input unit of the control device; and obtaining a first set of color values being measured color values of color patches of a color chart printed by the printer without color management. The processing further comprises calculating a second set of color values and a third set of color values, where the second set of color values correspond to the first set of color values and represent colors to be printed by the printer having a color gamut increased with a conditional change of the printer, and the third set of color values correspond to the first set of color values and represent colors to be printed by the printer having a color gamut reduced with a conditional change of the printer. The processing further comprises creating a first printer-profile, a second printer-profile and a third printer-profile by using the first set of color values, the second set of color values and the third set of color values. The processing further comprises, on a basis of the conditions input by the user, calculating theoretical reference values of color values of a target of the color verification, by using a predetermined target profile. The processing further comprises calculating first theoretical color values, second theoretical color values and third theoretical color values from the theoretical reference values by using the first to third printer-profiles. The processing further comprises obtaining an estimated result of the color verification on a basis of comparison between a preset standard value and each of first to third color differences, where the first to third color difference each represents a difference between the theoretical reference values and corresponding one of the first theoretical color values, the second theoretical color values and the third theoretical color values. The processing further comprises outputting the estimated result through the output unit of the control device.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 16A is a table illustrating an example of results of color verification (in the case of $\Delta E \leq 3$) pertaining to Example 1;

FIG. 16B is a table illustrating an example of results of color verification (in the case of $\Delta E \leq 6$) pertaining to Example 1;

FIG. 16C is a table illustrating an example of results of color verification (in the case of $\Delta E \leq 7$) pertaining to Example 1;

FIG. 16D is a table illustrating an example of results of color verification (in the case of $\Delta E \leq 8$) pertaining to Example 1;

FIG. 17 is a diagram illustrating an example of a table showing the correspondence of judgement levels with estimated acceptance ratios;

FIG. 18 is a diagram illustrating an example of a list of estimated results of color verification pertaining to Example 1;

FIG. 20 is a diagram illustrating an example of a screen of color verification estimation pertaining to Example 2;

FIG. 21 is a diagram illustrating another example of a screen of color verification estimation pertaining to Example 2; and FIG. 22 is a diagram illustrating an example of a screen of color verification estimation (a screen of detailed results for custom settings) pertaining to Example 2.

DESCRIPTION OF THE PREFERRED EMBODIMENTS

Figure 1:
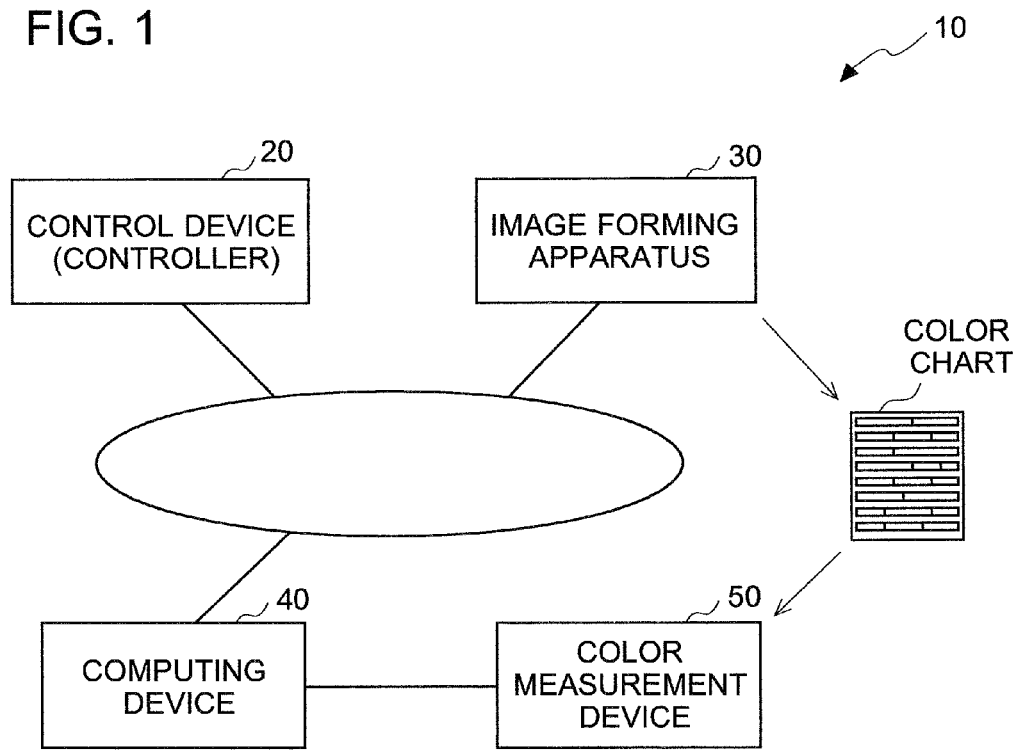
FIG. 1 is a schematic diagram illustrating an example of the structure of a color printing system pertaining to Example 1.

Hereinafter, an embodiment of the present invention will be described with reference to the drawings. However, the scope of the invention is not limited to the illustrated examples.

Methods, control devices and non-transitory computer-readable storage media each storing a program, for estimating a result of color verification, as embodiments of the present invention, can realize efficient execution of color verification and reduce a wasteful use of consumption materials and occurrence of excessive processes in the color verification, for the following reasons.

The control device obtains a first set of color values which are measured color values of a color chart printed by a printer without performing color management, and calculates a second set of color values and a third set of color values which correspond to the first set of color values and are obtained in consideration of conditional changes (predetermined device variation) of the printer. The second set of color values represent colors to be printed by the printer having a color gamut increased with a conditional change of the printer. The third set of color values represent colors to be printed by the printer having a color gamut increased with a conditional change of the printer. The control device further creates first to third printer-profiles by using the first set of color values, the second set of color values and the third set of the color values. The control device further calculates theoretical reference values T of color values of a target of the color verification, by using a predetermined target profile. The control device further calculates first theoretical color values, second theoretical color values and third theoretical color values from the theoretical reference values T by using the first to third printer-profiles. The control device obtains an estimated result of the color verification on the basis of color differences each between the theoretical reference values T and corresponding one of the first to third theoretical color values. The control device then outputs the estimated result so as to inform a user about the estimated result or recommend a user to change a setting of a judgement level of color verification.

In the case where because of a use of a new type of paper, color reproduction with an image forming apparatus is estimated to fail to satisfy the standard or criterion of color verification even after a full use of color calibration function of the image forming apparatus, a user can determine to cancel the execution of the color verification with this estimation. Accordingly, it can prevent a wasteful use of consumption materials and occurrence of excessive processes coming from a repetition of color verification and color calibration, before they arise.

Further, before execution of color verification, a user can change the judgment level of the color verification to an appropriate level at which the color verification function effectively works. It can prevent a wasteful use of consumption materials and occurrence of excessive processes coming from a repetition of color verification and color calibration before they arise. Further, it allows an appropriate and effective use of the color verification function of the apparatus, for providing output matters with stable color accuracy.

Furthermore, when conditions and results of color verification are stored into a database in the estimation, it allows a user to determine whether or not the paper type concerned is a paper type for which color verification has ever not been executed. Further, if it is a paper type which has already been recorded in the database, it allows a user, who has not executed color verification for the paper type, to set appropriate conditions of color verification. Accordingly, it can prevent a wasteful use of consumption materials and occurrence of excessive processes relating to color verification before they arise.

As described in the background art, when a paper type has been changed in an image forming apparatus, color verification is performed on printed colors. To perform the color verification, the image forming apparatus performs color management by using a printer profile and then outputs a color chart, and the output color chart is measured. If a result indicating unacceptable color reproduction accuracy is obtained as a result of color verification, execution of color calibration, output of a color chart after the color calibration and color measurement of the color chart are needed until a verification result indicating acceptable color accuracy is obtained. Therefore, in the case where the standards of color verification are hardly satisfied even after a full use of color calibration function of the image forming apparatus, it needs an additional operation to execute color verification and color calibration to be performed repeatedly, which arises problems of a wasteful use of consumption materials and occurrence of excessive processes relating to the color verification.

In view of that, one embodiment of the present invention employs estimation of a color verification result, which estimates a result of color verification prior to actual execution of the color verification, when usage conditions of an image forming apparatus have been changed, for example, when the image forming apparatus prints with a new paper types. The estimation of a color verification result does not include outputting of a color chart and measurement of the color chart after execution of color management, which is different from an actual execution of the color verification, and includes calculating plural sets of color values to be obtained when color gamut of the image forming apparatus is increased or reduced due to device variation (conditional change) of an engine or the like of the image forming apparatus; and estimating a result of actual execution of the color verification by judging color reproduction accuracy on the basis of color differences between each of plural set of color values obtained by calculation and reference color values.

In concrete terms, the estimation includes causing a user to set conditions (a device type, a paper type, a standard color, a judgement level, etc.) to be used in color verification; causing an image forming apparatus to output a color chart without performing color management (including color space conversion); obtaining a set of color values by measuring the output color chart; and creating a first printer-profile by using the set of color values. The estimation further includes calculating other sets of color values each corresponding to a color gamut increased or reduced due to device variation of the image forming apparatus (in other words, plural sets of color values obtained in consideration of device variation of the image forming apparatus); and calculating second and third printer-profiles by using the sets of color values. The estimation further includes calculating theoretical color values of a target on which color calibration of a printer was performed by using these printer profiles; and estimating a result of color verification by using color differences each between the calculated theoretical color values and predetermined reference values. The estimation optionally includes outputting the estimated result so as to inform a user about the estimated result, outputting conditions which can satisfy a judgement standard of color verification, and storing the estimated result in a database so as to allow a user to access the result.

With this estimation, in the case where color reproduction with a use of a new type of paper in an image forming apparatus, is estimated to result in failure to satisfy the judgement standard or criterion of color verification even after a full use of color calibration function of the image forming apparatus, it allows a user to determine to cancel execution of the color verification. Further, with this estimation, it allows a user to use appropriate conditions of color verification. Accordingly, such estimation can prevent a wasteful use of consumption materials and occurrence of excessive processes coming from a repetition of color verification and color calibration, before they arise.

EXAMPLES

Example 1

A method of estimating a result of color verification, a control device and a non-transitory computer-readable storage medium storing a program for estimating a result of color verification pertaining Example 1 will be described with reference to FIGS. 1 to 18 so as to describe the above-described embodiments in detail.

As illustrated in FIG. 1, color printing system 10 of the present example includes control device 20 (controller), an image forming apparatus 30 (printer), computing device 40 and color measurement device 50. The control device 20, the image forming apparatus 30, and the computing device 40 are connected to each other via communication networks, such as an intranet, so as to be able to perform data communication. Further, the computing device 40 and the color measurement device 50 are connected to each other via a P2P (peer-to-peer) architecture so as to be able to perform data communication.

Figure 2:
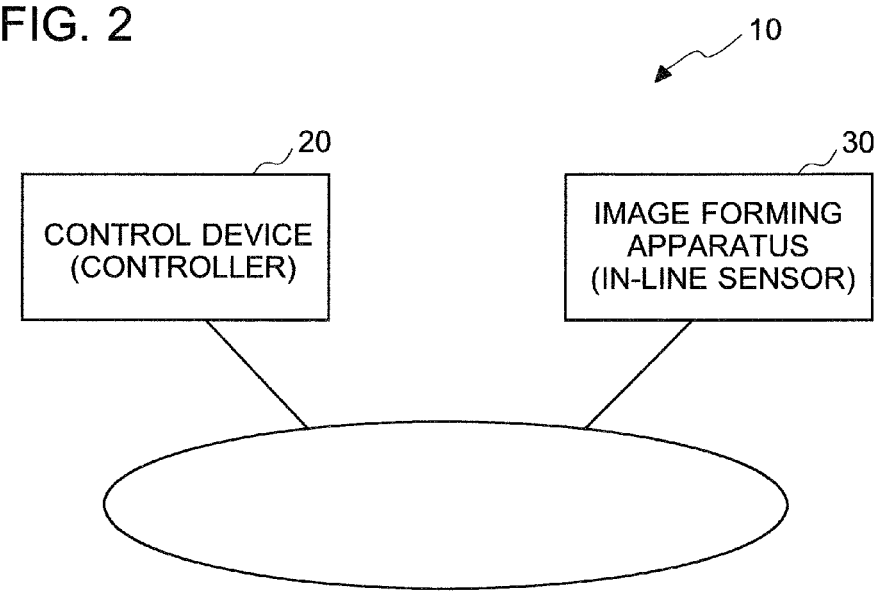
FIG. 2 is a schematic diagram illustrating another example of the structure of a color printing system pertaining to Example 1.

Color printing system 10 in FIG. 1 includes image forming apparatus 30 configured to output a color chart, and color measurement device 50 configured to measure colors of the given color chart. Alternatively, as illustrated in FIG. 2, color printing system 10 may include image forming apparatus 30 (printer) in which a color measurement device is incorporated (for example, a scanner section or an in-line sensor serves as the color measurement device). In such system, computing device 40 and color measurement device 50 may be omitted. Hereinafter, each device will be described in detail.

Figure 3A:
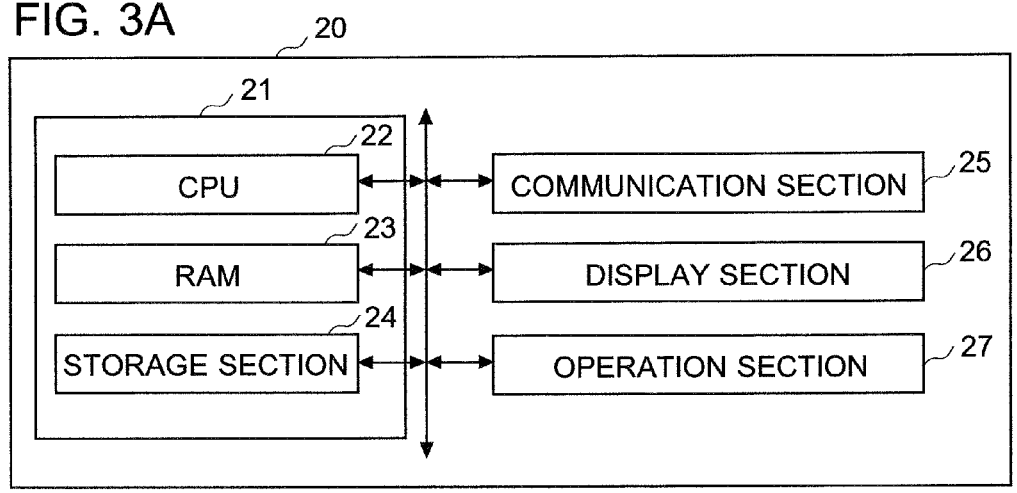
FIGS. 3A and 3B are block diagrams illustrating an example of the structure of a control device pertaining to Example 1.

Control Device:

Control device (controller) 20 is a computing device, and as illustrated in FIG. 3A, includes control section 21, communication section 25, display section 26 and operation section 27.

Control section 21 includes CPU (Central Processing Unit) 22, RAM (Random Access Memory) 23 and storage section 24. RAM 23 memorizes data required for control by the CPU 22, data required to be memorized temporarily during control operation, and the like. Storage section 24 may be a nonvolatile device, such as a HDD (Hard Disk Drive) and a SSD (Solid State Drive), or a nonvolatile memory, such as a NVDIMM (Non-Volatile Dual In-line Memory Module), a MRAM (Magnetoresistive Random Access Memory) and a ReRAM (Resistance Random Access Memory), and the storage section 24 memorizes control programs and data required for control. CPU 22 reads out a program from the storage section 24, load the program on the RAM 23, and executes the program, thereby controlling the whole operations of the control device 20.

Figure 3B:
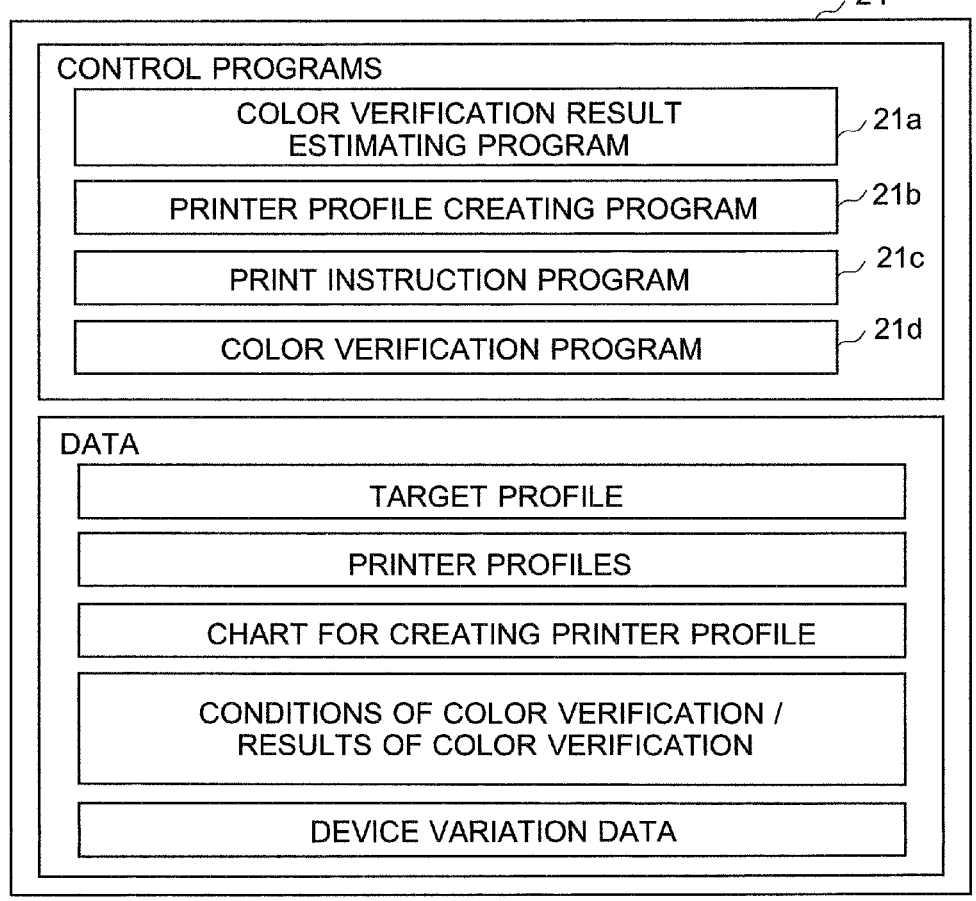

FIG. 3B illustrates control programs and data which are memorized in storage section 24. Storage section 24 memorizes control programs, such as color verification result estimating program 21*a*, printer profile creating program 21*b*, print instruction program 21*c*, and color verification program 21*d*. Then, based on these control programs, the control section 21 works as a color verification result estimating section, a printer profile creating section, a print instruction section, and a color verification section. Further, storage section 24 memorizes data of conditions and results of color verification, device variation data, printer profiles (each including a first lookup table and a second lookup table), target profiles (a first lookup table and a second lookup table), and data of a chart for creating a printer profile.

Color verification result estimating program 21a, when being executed, causes the control section 21 to work as a color verification result estimating section that estimates a result of color verification. In concrete terms, the color verification result estimating section operates display section 26 to display a setting screen of color verification conditions to cause a user to input conditions of color verification on the screen, and sets the conditions of color verification in accordance with settings of the setting screen. Further, the color verification result estimating section obtains from computing device 40 color measurement data (a first set of color values or color values 1) which are measured color values obtained by measuring with color measurement device 50 color patches of a color chart printed by the image forming apparatus 30 (printer) without performing color management (including color space conversion). The color verification result estimating section then creates printer profile 1 (a first printer-profile) by using the color measurement data. The color verification result estimating section further calculates color values 2 and color values 3 (a second set of color values and a third set of color values) on the basis of data of device variation about the image forming apparatus 30 (printer) which have been prepared and stored previously. The color values 2 and color values 3 correspond to the color values 1 and each represent colors to be output by the image forming apparatus 30 (printer) the color gamut of which is increased or reduced according to the data of device variation. The color values 2 correspond to the increased color gamut and color values 3 correspond to the reduced color gamut. The color verification result estimating section creates printer profile 2 (a second printer-profile) and printer profile 3 (a third printer-profile) by using the color values 2 and color values 3. The color verification result estimating section calculates theoretical values T (theoretical reference values) of color values of a target of color verification by using a target profile which has been prepared and stored previously, on the basis of conditions of color verification which have been set previously. The color verification result estimating section further calculates theoretical color values 1, theoretical color values 2 and theoretical color values 3 from the theoretical reference values T of color values of the target, by using printer profile 1, printer profile 2 and printer profile 3, respectively. The theoretical color values 1, theoretical color values 2 and theoretical color values 3 each are color values of the target under the condition that color calibration of the printer was performed by using corresponding one of printer profile 1, printer profile 2 and printer profile 3. Then, the color verification result estimating section calculates color differences ΔE1, ΔE2, and ΔE3 each of which represents a difference between the theoretical values T and corresponding one of the theoretical color values 1, the theoretical color values 2, and the theoretical color values 3. On the basis of these color differences, the color verification result estimating section makes judgement of color reproduction accuracy to estimate a result of color verification, whether the color reproduction accuracy is acceptable or not. Further, the color verification result estimating section outputs the result of the color verification through an output unit such as display section 26 to inform a user about the result. If obtaining an estimated result indicating acceptable color reproduction accuracy, the color verification result estimating section stores the conditions and the result of color verification in a database with the conditions and the result being associated with each other. If obtaining an estimated result indicating unacceptable color reproduction accuracy, the color verification result estimating section sets a color verification prohibition flag and stores the conditions and the result of color verification and the color verification prohibition flag in a database with the conditions, the result and the flag being associated with each other; and/or presents recommended conditions of color verification to a user.

Printer profile creating program 21b, when being executed, causes the control section 21 to work as a printer profile creating section. In concrete terms, the printer profile creating section creates a device profile including a first lookup table which converts CMYK values into L*a*b* values and a second lookup table which converts L*a*b* values into CMYK values in accordance with instructions given by the color verification result estimating program 21a or the color verification program 21d.

Print instruction program 21c, when being executed, causes the control section 21 to work as a print instruction section. In concrete terms, the print instruction section sends data of a color chart for creating a printer profile, which have been prepared and stored previously, and gives instructions to print the color chart to the image forming apparatus 30, in accordance with instructions given by the color verification result estimating program 21a or the color verification program 21d.

Color verification program 21d, when being executed, causes the control section 21 to work as a color verification section. In concrete terms, the color verification section obtains from computing device 40 color measurement data which are measured color values obtained by measuring with color measurement device 50 color patches of a color chart printed by the image forming apparatus 30 (printer) without performing color management (including color space conversion). The color verification section then creates a printer profile by using the color measurement data. The color verification section further creates a device link profile by using the created printer profile (alternatively, if the printer profile has been created beforehand, the given printer profile) and a target profile which has been prepared and stored beforehand, and then executes color management of the image forming apparatus 30 by using the device link profile. Then, the color verification section causes the image forming apparatus 30 to print a color chart again, obtains from computing device 40 color measurement data which are measured color values obtained by measuring with color measurement device 50 color patches of the color chart. On the basis of the color measurement data, the color verification section judges color reproduction accuracy to obtain an estimated result of color verification. If obtaining a result indicating unacceptable color reproduction accuracy, the color verification section causes the image forming apparatus 30 to activate color calibration function, and then printing a color chart and measurement of the color chart and execution of color verification are repeated.

Communication section 25 includes components such as a NIC (Network Interface Card) and a modem, and performs data communication with image forming apparatus 30 and computing device 40.

Display section 26 is a display (output unit), such as a LCD (Liquid Crystal Display) and an organic EL (Electro Luminescence) display, and displays various kinds of screens, such as a screen of color verification results, a screen of result details and a setting screen of conditions of color verification. Operation section 27 is an input unit, such as a mouse and a keyboard, and allows a user to perform various operations, such as operations to set a judgement level of color verification on the screen of color verification results and the screen of detailed results, and operations to set conditions of color verification on the setting screen of conditions of color verification.

Figure 4A:
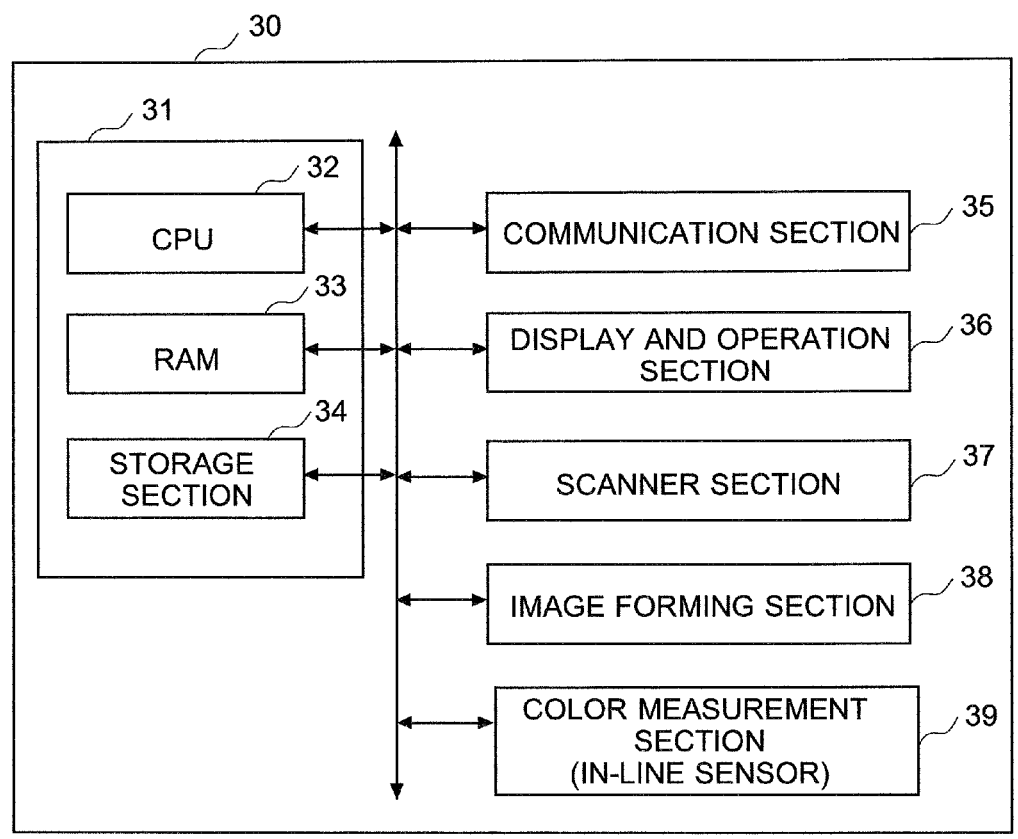
FIGS. 4A and 4B are block diagrams illustrating an example of the structure of an image forming apparatus pertaining to Example 1.

Image Forming Apparatus:

Image forming apparatus 30 is a MFP (Multi-Functional Peripherals) or the like, and as illustrated in FIG. 4A, includes control section 31, communication section 35, display and operation section 36, scanner section 37, image forming section 38, and optionally color measurement section 39.

Control section 31 includes CPU 32, RAM 33 and storage section 34. RAM 33 memorizes data required for control by the CPU 32, data required to be memorized temporarily at the time of control operation, and the like. The storage section 34 may be a nonvolatile device, such as a HDD and a SSD, or a nonvolatile memory, such as a NVDIMM, a MRAM and a ReRAM, and memorizes control programs and data required for control. CPU 32 reads out a program from the storage section 34, loads the program on the RAM 33, and executes the program, thereby controlling the whole operations of the image forming apparatus 30.

Figure 4B:
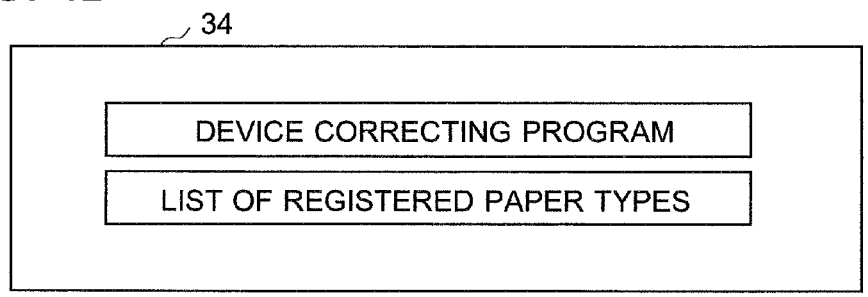

FIG. 4B illustrates a control program and data which are memorized in the storage section 34. Storage section 34 memorizes a device correcting program, a list of registered paper types, and the like. The device correcting program causes control section 31 to execute a correction operation, such as calibration and a highest density adjustment.

Communication sections 35 includes components such as an NIC and a modem, and performs data communication with control device 20. Display and operation section 36 is a touch panel in which an operation section, such as a touch sensor, is arranged on a display section, such as an LCD and an organic electroluminescence display, and enables various kinds of indication and allows a user to perform operations in relation to printing on itself.

Scanner section 37 is a section which reads out an image optically from a document placed on a document stage to obtain image data, and is optionally disposed in the color printing system 10 illustrated in FIG. 2. This scanner section 37 includes a light source which scans a document, an image sensor, such as a CCD (Charge Coupled Devices), which converts light reflected on a document into electrical signals, and an A/D converter which performs A/D conversion on the electrical signals.

Image forming section 38 is an engine which forms an image on a paper sheet in accordance with an electrophotography process based on image data received from control device 20. In concrete terms, the image forming section 38 includes a photoreceptor unit which includes a photoreceptor drum, a writing unit to perform exposure processing by irradiating the photoreceptor drum with a laser beam in accordance with image data, a developing unit, a charging unit, a photoreceptor cleaning unit, and a primary transfer roller, and is configured to form a toner image in each color of C, M, Y, and K. The image forming section 38 further includes an intermediate transfer belt which is rotated by rollers and functions as an intermediate transfer body to convey toner images formed by the photoreceptor unit to a paper sheet; a secondary transfer roller which transfers toner images formed on the intermediate transfer belt onto a paper sheet; a fixing unit which fixes toner images transferred onto a paper sheet; and a conveying section to convey a paper sheet, such as a paper sheet feeding roller, a registration roller, a loop roller, a reversing roller, and a paper sheet delivering roller, and the like.

Color measurement section 39 preferably includes an in-line color measurement equipment which measures colors of an image of a color chart on which color patches are arrayed. For example, this in-line color measurement equipment can be a color measurement equipment of a spectrum system (spectrophotometer) which can measure light for each wavelength of light similarly to an external color measurement device and can obtain color values by color measurement with the same accuracy as an external color measurement device. Further, color measurement section 39 may include both the above in-line color measurement equipment and an in-line sensor. The in-line sensor is constituted by three kinds of R, G, and B sensors and converts R, G, and B values acquired respectively by the R, G, and B sensors into color values in a certain color space. The color measurement section 39 is disposed on a conveyance path of a paper sheet between the fixing unit and a paper sheet ejection tray of the image forming section 38. The color measurement data (color values) obtained by measuring colors of a color chart with color measurement section 39 are transferred to control section 31, and transmitted from the control section 31 to control device 20.

Computing Device:

Computing device 40 memorizes a color measurement program, controls the color measurement device 50 by executing the color measurement program, and transmits color measurement data (color values) obtained from the color measurement device 50 to the control device 20.

Color Measurement Device:

Color measurement device 50 is a device for measuring colors of a color chart, for example, performs color measurement with a spectrum system (spectrophotometer) capable of performing measurement for each wavelength of light, and outputs color measurement data (color values) to computing device 40.

FIG. 1 to FIG. 4B illustrate an example of a color printing system 10 of the present example, and its constitution can be modified appropriately. For example, in color printing system 10 of FIG. 1, color measurement device 50 is connected to computing device 40. Alternatively, color printing system 10 may have a structure such that a color measurement program is memorized in storage section 24 of control device 20 and control device 20 is configured to control the color measurement device 50. Further, in FIG. 3B, the color verification result estimating program 21a, the printer profile creating program 21b, the print instruction program 21c, and the color verification program 21d are executed on control section 21 of control device 20. Alternatively, these control programs may be memorized in storage section 34 of image forming apparatus 30 to be executed on control section 31 of image forming apparatus 30.

Hereinafter, description is given to estimation of color verification at the time of using a new type of paper in image forming apparatus 30. CPU 22 of control section 21 loads control programs memorized in the storage section 24 on RAM 23 and executes the control programs, thereby executing the processing of steps shown in the flowcharts of FIG. 5 to FIG. 10.

Figure 5:
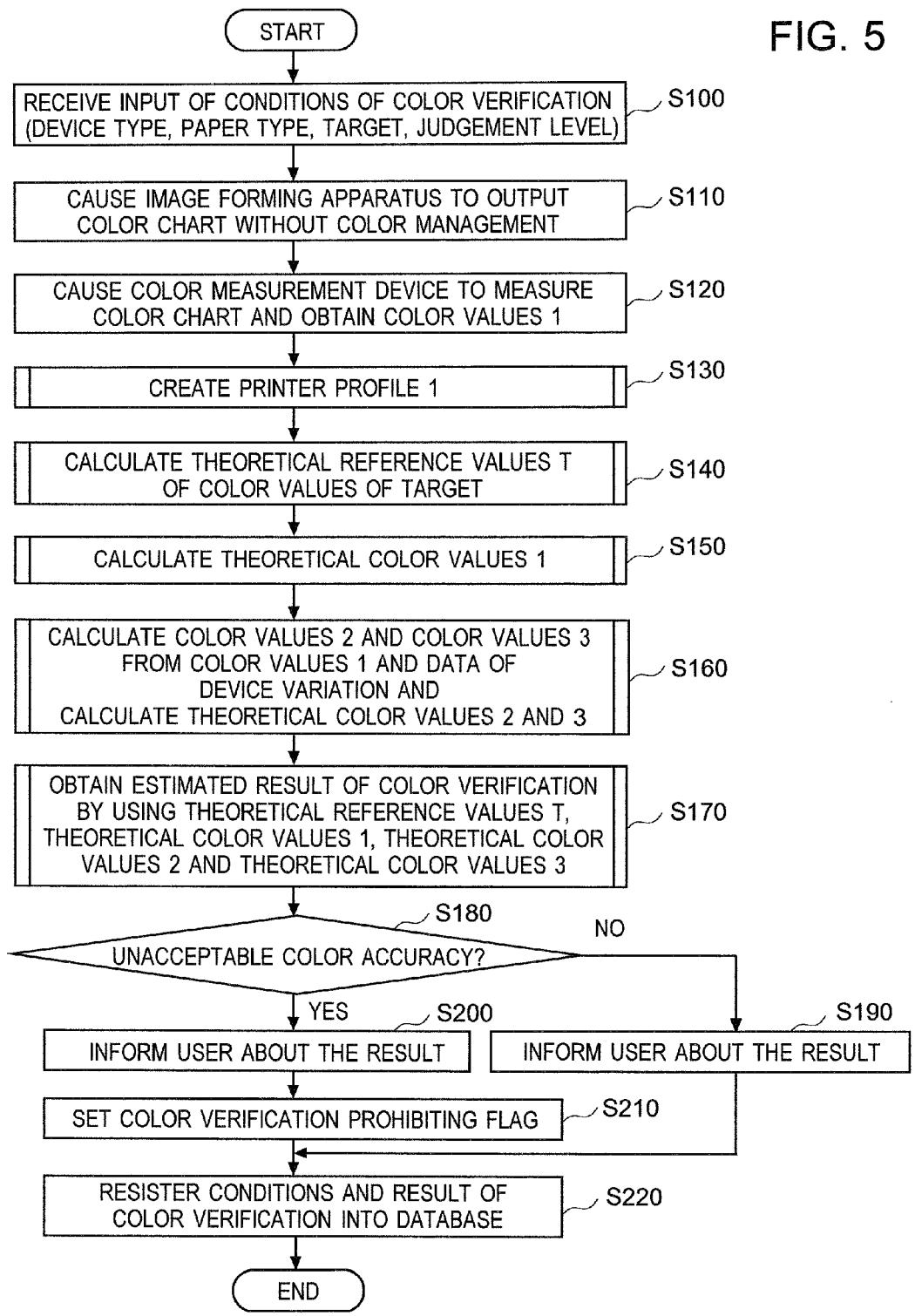
FIG. 5 is a flowchart illustrating operation (estimation of color verification result) of the control device pertaining to Example 1.
Figure 11:
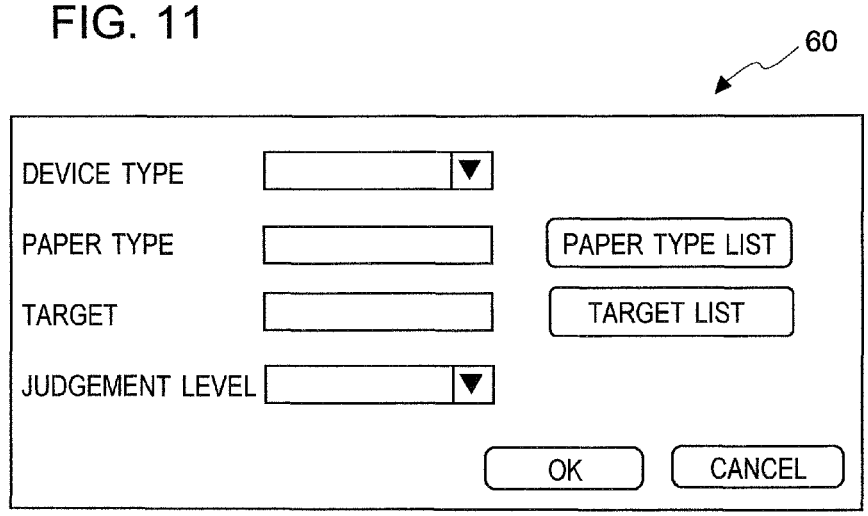
FIG. 11 is an illustration of an example of a setting screen of conditions of color verification pertaining to Example 1.

As illustrated in FIG. 5, control section 21 (when executing color verification result estimating program 21a) causes display section 26 to display a setting screen of conditions of color verification, and causes or prompts a user to input conditions of color verification through operation section 27 (input unit such as a mouse and a keyboard) (S100). In this process, the control section 21 obtains a list of registered paper types from image forming apparatus 30. FIG. 11 illustrates an example of the setting screen 60 of conditions of color verification, and the screen shows, as conditions of color verification, a device type, a paper type, a target, a judgment level so as to allow a user to set these conditions. The device type designates a classification of image forming apparatus 30 which outputs a color chart, to be used to define image forming apparatus 30 to which print instructions is given. The paper type designates a classification of paper on which images are formed. When the 'paper type list' button is depressed, display section 26 displays a list of paper types registered in the database (alternatively, after a user inputs a name of paper type in the box of the paper type in the screen 60 and then depress the 'paper type list' button, display section 26 displays a list of paper types registered in the database in the order of similarity to the name), and a user chooses a desired paper type from the paper type list. Alternatively, if a paper type to be used is not registered in the paper type list, a user inputs a name of the paper type. The target designates a standard color to be used as a target of color verification (for example, colors of "Japan Color", "Fogra", "GRACoL", etc. enacted based on ISO-12647-2). When the 'target list' button is depressed, display section 26 displays a target list registered beforehand, and a user chooses a desired target from the target list. The judgment level represents a criterion or a judgement standard of judging color reproduction accuracy of color verification, and has plural options, such as "lax", "medium", and "strict" levels. A user chooses a desired judgment level from the options. Then, the control section 21 (when executing color verification result estimating program 21a) sets conditions of color verification in accordance with conditions on the screen 60 of conditions of color verification (at least, a device type, a standard color to be used as a target, paper type and a judgment level of color verification), and stores the conditions of color verification in storage section 24.

Next, control section 21 (when executing print instruction program 21c) reads out data of a color chart for creating a printer profile, memorized in the storage section 24, in accordance with instructions given by the color verification result estimating program 21a, transmits the data without performing color management to the image forming apparatus 30, and causes the image forming apparatus 30 to output a color chart (S110). The computing device 40 causes color measurement device 50 to measure colors of the color chart, and obtains color measurement data (color values 1). The control section 21 (when executing color verification result estimating program 21a) obtains from the computing device 40 color values 1 of colors which constitutes the color chart (S120). In the case where the color printing system 10 is constituted as illustrated in FIG. 2, the control section 21 (print instruction program 21c) transmits the data of a color chart for creating a printer profile memorized in the storage section 24 to the image forming apparatus 30 without performing color management in accordance with instructions given by the color verification result estimating program 21a. Successively, the image forming apparatus 30 forms an image of a color chart by using the image forming section 38, measures colors of the image of the color chart by using the color measurement section 39, and obtains color measurement data (color values 1). Then, the control section 21 (when executing color verification result estimating program 21a) obtains from the image forming apparatus 30 color values 1 of colors which constitute the color chart. Herein, it is preferable that the image forming apparatus 30 has executed an apparatus correcting operation, such as color calibration and highest density adjustment before outputting a color chart.

Next, the control section 21 (when executing printer profile creating program 21b) creates printer profile 1 by using the color value 1 obtained at the above steps in accordance with instructions given by the color verification result estimating program 21a (S130).

Figure 6:
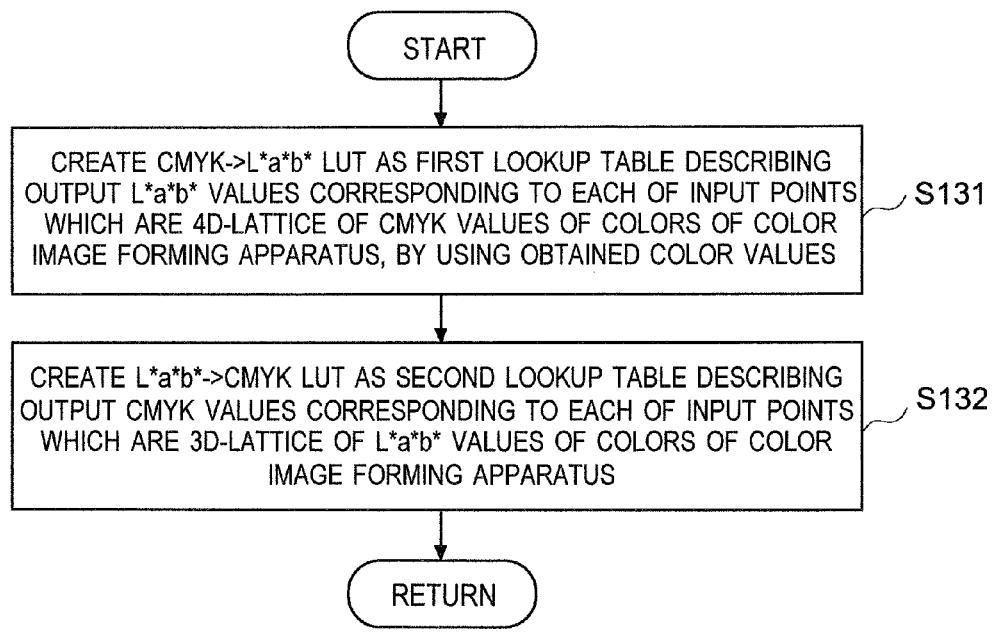
FIG. 6 is a flowchart illustrating operation (creation of a printer profile) of the control device pertaining to Example 1.

FIG. 6 illustrates the details of this step. That is, the control section 21 (when executing printer profile creating program 21b) creates from the obtained color values 1 a CMYK→L*a*b* LUT as a first lookup table describing output L*a*b* values corresponding to each of input points which are a 4D-lattice of CMYK values of colors of the image forming apparatus 30 (S131). In the first lookup table, for example, L*a*b* values corresponding to 6561 points are stored, where the 6561 points are obtained by the multiplication of the numbers of C, M, Y, and K values: 9×9×9×9 points. Herein, among the 6561 points, for a point in which there is no measurement point on a color chart, corresponding color values may be calculated by interpolation based on color values for the surrounding points. Further, the control section 21 (when executing printer profile creating program 21b) creates a L*a*b*→CMYK LUT as a second lookup table describing output C, M, Y, and K values corresponding to each of input points which are a 3D lattice of L*, a*, and b* values of colors of the image forming apparatus 30 (S132). In the second lookup table, for example, C, M, Y, and K values corresponding to 35937 points are stored, where the 35937 points obtained by the multiplication of the numbers of L*, a* and b* values: 33×33×33 points.

Now, description returns to the flow chart shown in FIG. 5. Based on the conditions of color verification set at S100, the control section 21 (when executing color verification result estimating program 21a) calculates, by using a predetermined target profile, theoretical reference values T of color values of the target of color verification necessary for calculating a judgment standard (a standard value which represents a color difference becoming a criterion or standard of judging color reproduction accuracy to obtain a result color verification) (S140).

Figure 7:
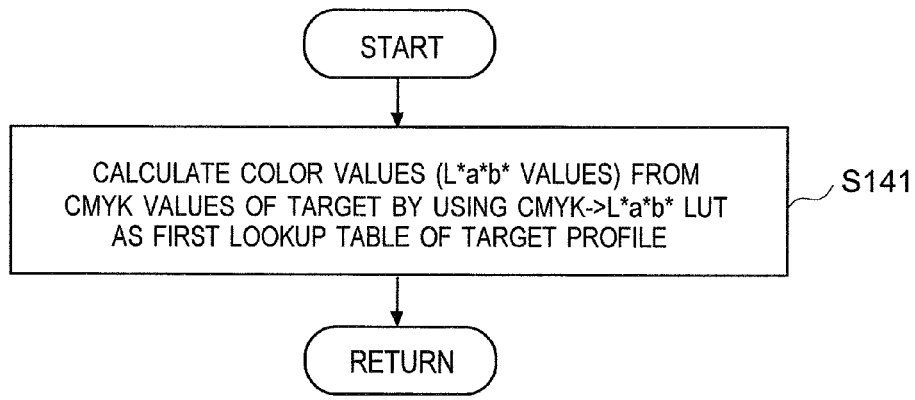
FIG. 7 is a flowchart illustrating operation (calculation of theoretical reference values T of color values of a target) of the control device pertaining to Example 1.

FIG. 7 illustrates the details of this step. That is, the control section 21 (when executing color verification result estimating program 21a) calculates color values (L*a*b* values) by using the CMYK→*L*a*b* LUT as the first lookup table of the target profile memorized beforehand in the storage section 24, from CMYK values of a reference color (a standard color to be a target of color verification) used for calculating a judgment standard (S141). The color values become the theoretical reference values T of the color values of the target.

Now, description returns to the flowchart illustrated in FIG. 5. Based on the conditions of color verification set at S100, the control section 21 (when executing color verification result estimating program 21a) calculates theoretical color values 1 by using printer profile 1 created at S130, where the theoretical color values 1 are theoretical values of color values of the target on which color calibration of a printer was performed by using these printer profiles and are necessary for calculating a judgment standard (S150).

Figure 8:
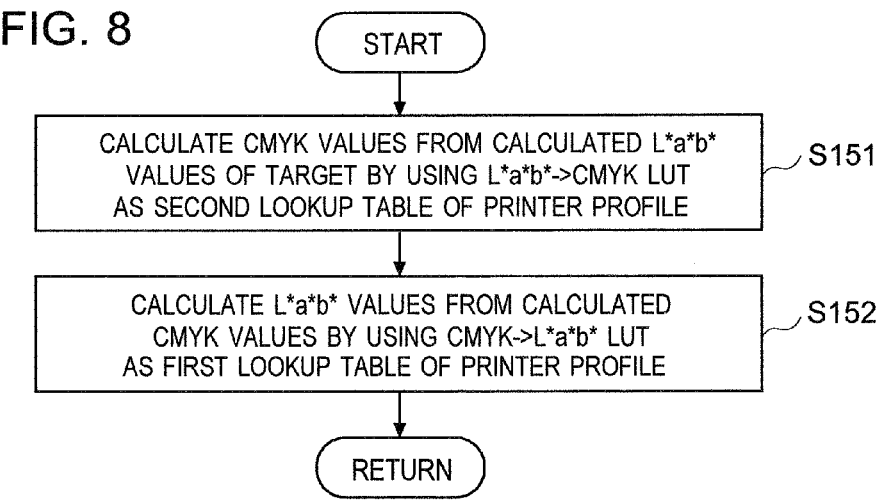
FIG. 8 is a flowchart illustrating operation (calculation of first theoretical color values of a printer's color) of the control device pertaining to Example 1.

FIG. 8 illustrates the details of this step. That is, the control section 21 (when executing color verification result estimating program 21a) calculates CMYK values from the L*a*b* color values of the target calculated at S140 by using L*a*b*→CMYK LUT as the second lookup table of the printer profile 1 created at S130 (S151). Further, the control section 21 (when executing color verification result estimating program 21a) calculates color values (L*a*b* values) from the calculated CMYK values by using CMYK→*L*a*b* LUT as the first lookup table of the printer profile 1 (S152). The color values become the theoretical color values 1 of the color values of the printer's color on which color calibration of a printer is executed.

Now, description returns to the flowchart illustrated in FIG. 5. The control section 21 (when executing color verification result estimating program 21a) calculates color values 2 and color values 3 corresponding to color values 1 obtained at S120, under the condition that color gamut of the image forming apparatus 30 (printer) is increased or reduced with a conditional change of the printer, where the color values 2 correspond to an increased color gamut and the color values 3 corresponds to a reduced color gamut. In concrete terms, by using the color values 1 obtained at S120 and data of device variation of the image forming apparatus 30 (printer) memorized beforehand in the storage section 24, the control section 21 defines a variation amount of color values corresponding to a probability of occurrence of the conditional change of the image forming apparatus 30 (printer) and calculates the color values 2 (corresponding to an increased color gamut) and the color values 3 (corresponding to a reduced color gamut) in which the factor of device variation is added into the color values 1. After that, the control section 21 calculates theoretical color values 2 and theoretical color values 3 of color values of the target on which color calibration of a printer is executed (S160).

Figure 9:
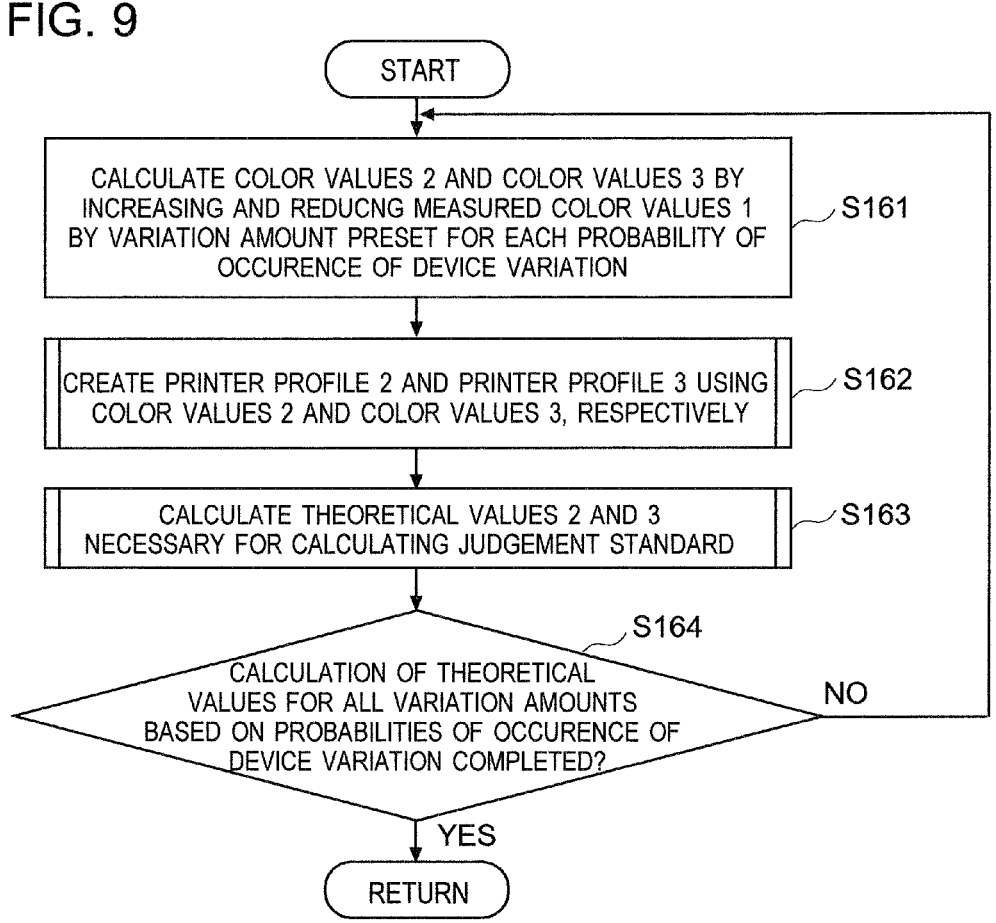
FIG. 9 is a flowchart illustrating operation (calculation of second and third theoretical color values of a printer's color defined in consideration of device variation) of the control device pertaining to Example 1.

FIG. 9 illustrates the details of this step. That is, the control section 21 (when executing color verification result estimating program 21a) increases or decreases the color values 1, which are obtained by measuring colors of the color chart, by the variation amount preset for each probability of occurrence of the condition change of the printer with respect to the reference value of device variation, to calculate color values 2 (corresponding to an increased color gamut) and color values 3 (corresponding to a reduced color gamut) corresponding to color values 1 of each of plural target colors (S161).

Figure 12:
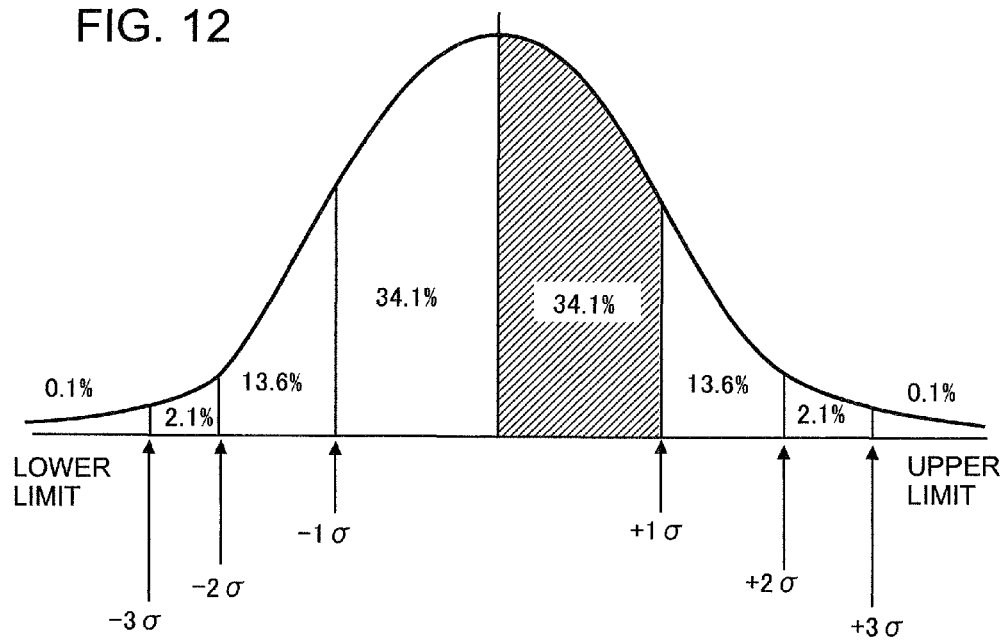
FIG. 12 is a diagram for illustrating the distribution of device variation.

Description is given concretely to a calculation procedure of the color values 2 and the color values 3. FIG. 12 illustrates an example of a distribution of device variation (conditional changes) of the image forming section 38 (engine) of the image forming apparatus 30, and illustrates the device variation which conforms with the normal distribution where the total of probabilities of occurrence of possible device variation is set to 100% or 1.0, and σ represents a standard deviation. The indexes of the device variation are defined by using L* and C* values, and the amounts of variation of L* and C* values corresponding to each distribution probability (each probability of occurrence of a conditional change of the image forming apparatus) from the center value (reference value) of the device variation, for each of colors in interest are stored as data of device variation in the storage section 24. Herein, with regard to colors falling within the printer's color gamut excluding a periphery of a surface of the printer's color gamut, device variation can be corrected with a correction function, such as color calibration. Accordingly, the colors of interest are defined as colors of 100% Cyan, 100% Magenta, 100% Yellow, 100% Red, 100% Green, 100% Blue and 100% Black.

Figure 13A:
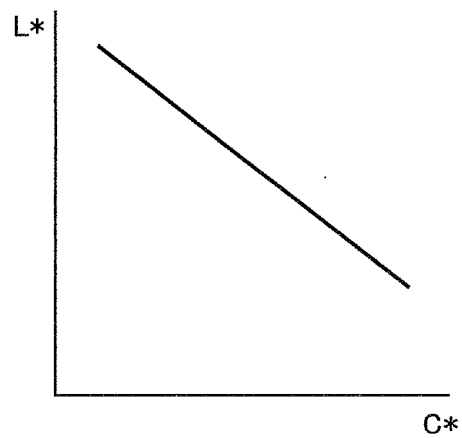
FIGS. 13A to 13C are graphs for illustrating a variation amount of color values due to device variation.
Figure 13B:
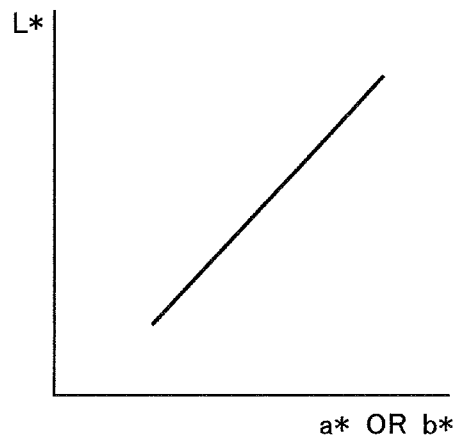
Figure 13C:
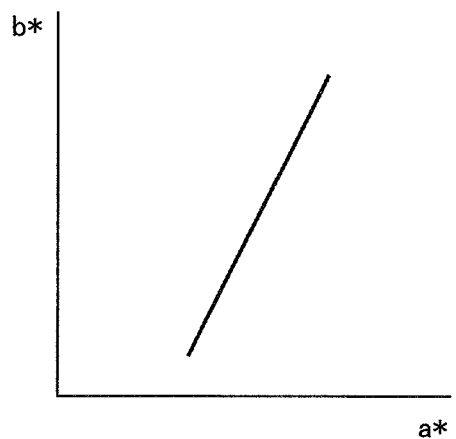

FIGS. 13A to 13C illustrate the relationship between the lightness values L* and the chroma values C*, the relationship between the lightness values L* and the a* or b* values, and the relationship between the a* values and the b* values, with respect to the color of 100% Cyan in the image forming apparatus 30. Based on these relationships, variation amounts ΔL*, Δa*, and Δb* of color values of each color of interest are calculated from the variation amounts of indexes L* or C* corresponding to a probability of occurrence of the conditional change from the center value (reference value) of device variation, and then color values 2 and color values 3 including the factor of device variation can be obtained by increasing and reducing the color values 1 of each color of interest by the calculated variation amount, respectively.

Figure 14:
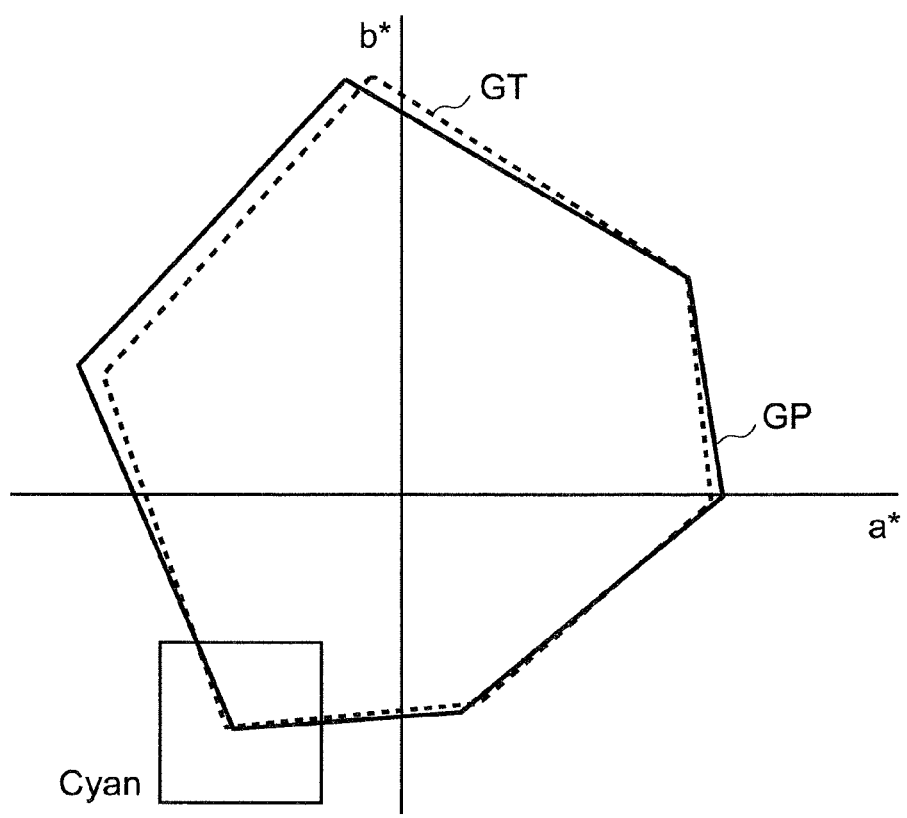
FIG. 14 is a graph for illustrating a printer's color gamut and a target color gamut.
Figure 15:
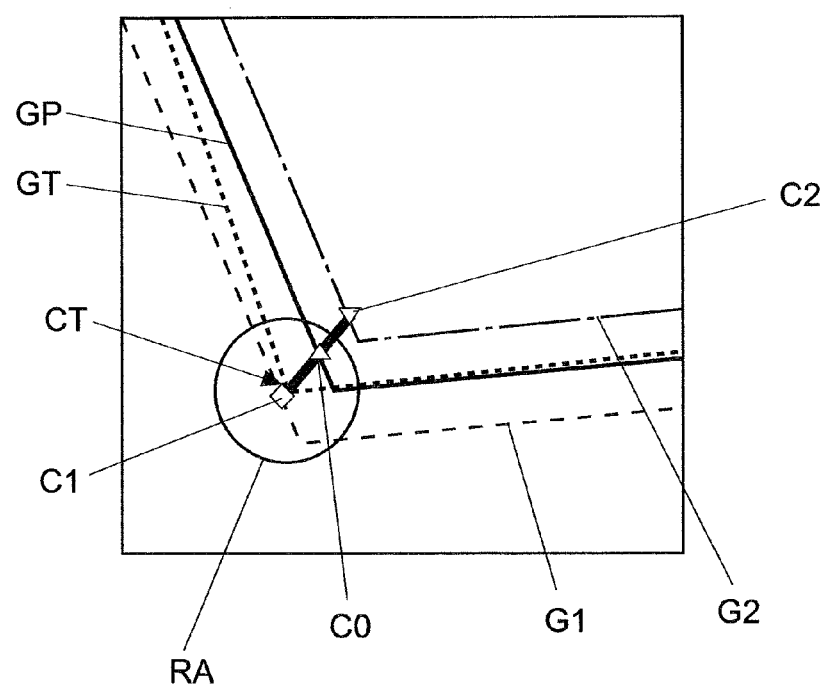
FIG. 15 is a graph for illustrating an increased color gamut and a reduced color gamut due to device variation.
Figure 19A:
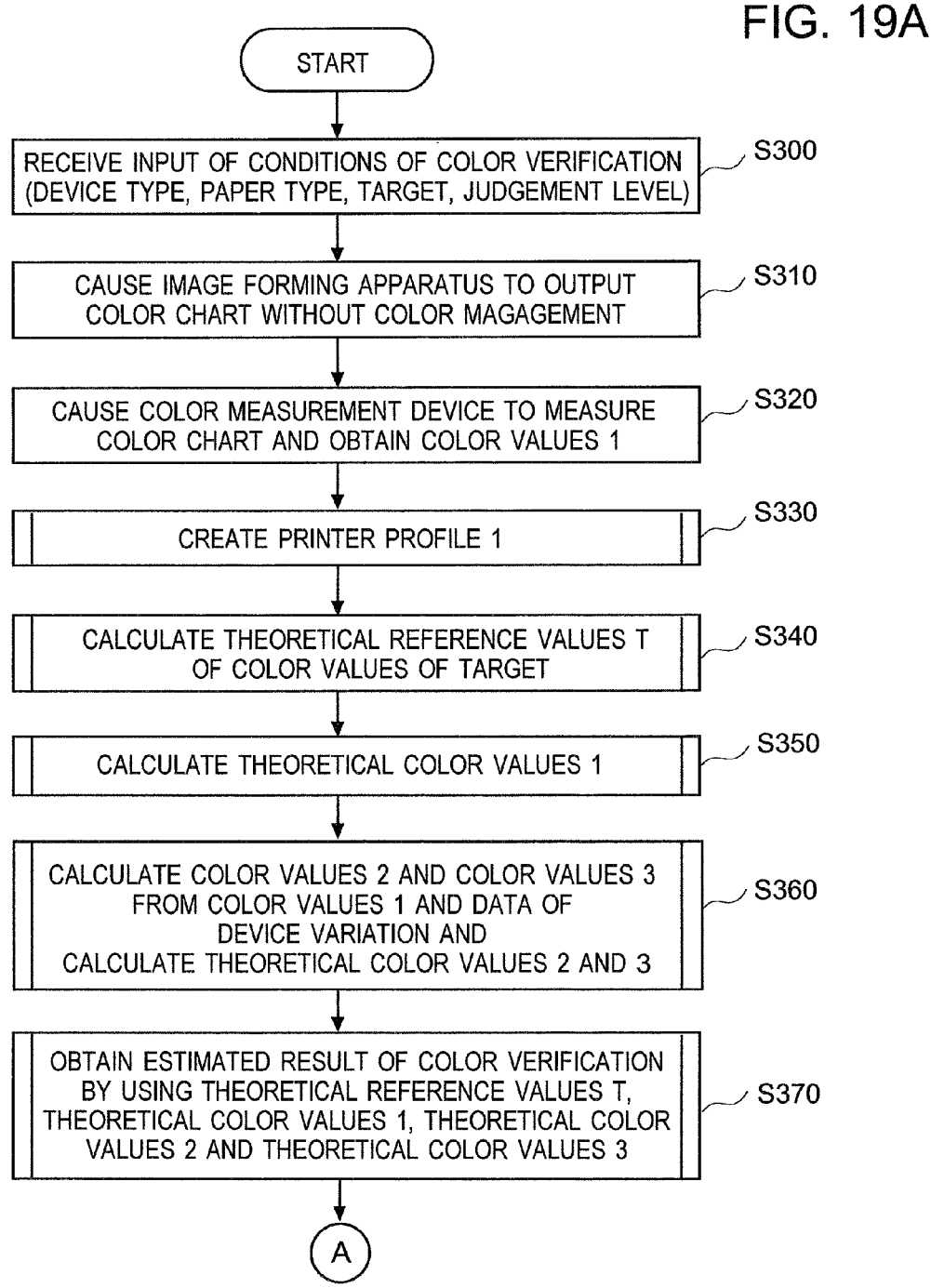
FIGS. 19A and 19B are a flowchart illustrating another example of operation (estimation of color verification result) of a control device pertaining to Example 2.
Figure 19B:
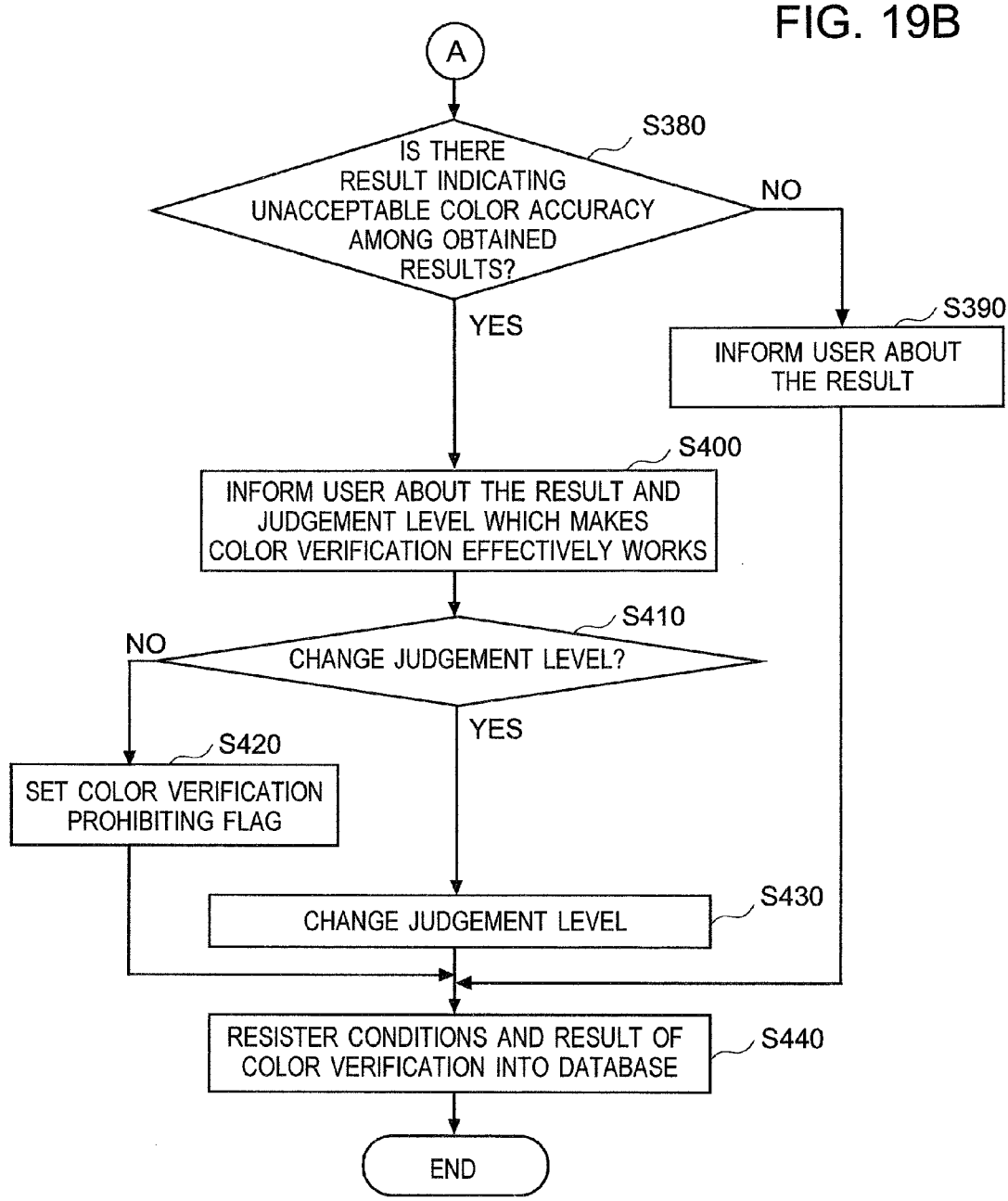

Description is given to the relationship among these color values 1 to 3 by taking the color of 100% Cyan as an example. FIG. 14 illustrates target color gamut GT (indicated with the broken line in FIG. 14) and printer's color gamut GP (indicated with the solid line in FIG. 14) on the a*-b* plane. FIG. 15 is an enlarged view of the region enclosed with the rectangle in FIG. 14. The printer's color gamut GP is increased or reduced with device variation of the engine. In FIG. 15, color gamut G1 increased due to the device variation is indicated with the broken line lied outside the printer's color gamut GP, and color gamut G2 reduced due to the device variation is indicated with the one dot chain line lied inside printer's color gamut GP. As a result, a color corresponding to the target color of Cyan 100% (color indicated by CT on the target color gamut GT) on which color calibration was performed becomes the color indicated by C0 (color values 1 on the printer's color gamut GP), when there is no device variation; becomes the color indicated by C1 (color values 2), when the color gamut is increased due to device variation; and becomes the color indicated by C2 (color values 3), when the color gamut is reduced due to device variation.

Now, description returns to FIG. 9. The control section 21 (when executing printer profile creating program 21b) creates printer profile 2 and printer profile 3 by using the color values 2 and the color values 3 calculated for each of colors of interest at the above step in accordance with instructions given by the color verification result estimating program 21a (S162). A creating method of the printer profile is the same as the method mentioned above with reference to FIG. 6.

Next, based on the settings of conditions of color verification, the control section 21 (when executing color verification result estimating program 21a) calculates theoretical color values 2 and theoretical color values 3 of color values of the target on which color calibration of a printer is executed, wherein the theoretical color values 2 and 3 become necessary for calculating the judgment standard (S163). A calculating method of the theoretical values of the color values is the same as the method above with reference to FIG. 8.

Subsequently, the control section 21 (when executing color verification result estimating program 21a) judges whether the calculation of the theoretical color values for all variation amounts corresponding to probabilities of occurrence of device variation which were preset have been completed (S164). If there is theoretical color values not calculated, the processing returns to S161, and the similar processing is repeated.

Now, again, description returns to the flowchart shown in FIG. 5. The control section 21 (when executing color verification result estimating program 21a) estimates a result of color verification by using the theoretical values T calculated at S140, the theoretical color values 1 calculated at S150, and the theoretical color values 2 and 3 calculated at S160 (S170). In concrete terms, the control section 21 calculates color differences ΔE1, ΔE2, ΔE3 each representing a difference between theoretical reference vales T of the color values of the target and corresponding one of the theoretical color values 1, theoretical color values 2 and theoretical color values 3 and compares the color differences ΔE1, ΔE2, ΔE3 with a preset judgement standard value to estimate a result of color verification.

Figure 10:
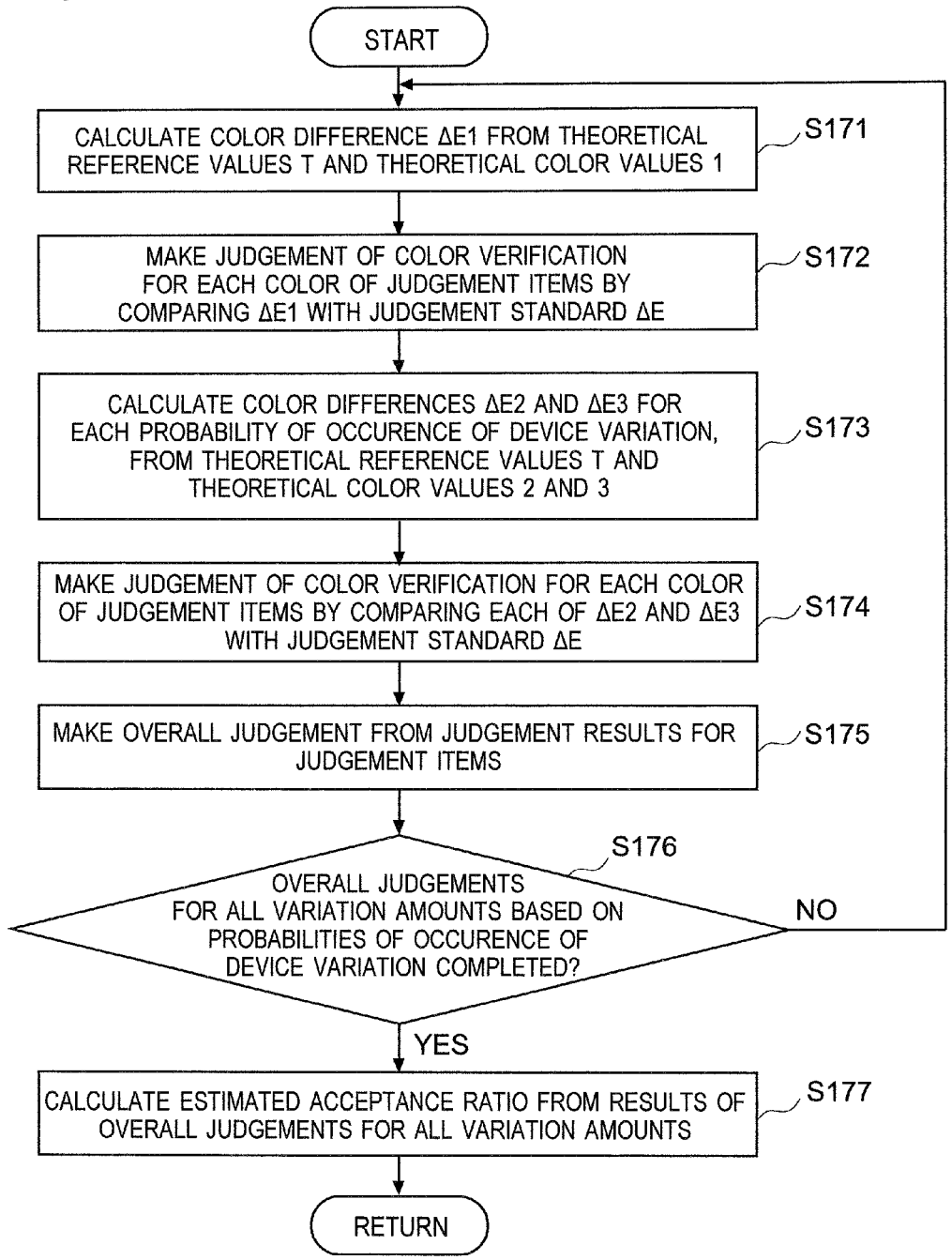
FIG. 10 is a flowchart illustrating operation (judgment of color verification) of the control device pertaining to Example 1.

FIG. 10 illustrates the details of this step in a specific example in the case where the judgment standard is set to ΔE. First, the control section 21 (when executing color verification result estimating program 21a) calculates color difference ΔE1 from the theoretical reference values T of the color values of the target and the theoretical color values 1 of the target on which color calibration of the printer is executed (S171), compares the color difference ΔE1 with the judgment standard ΔE, and judges whether the color reproduction accuracy is acceptable or not for each of colors of judgement items (S172).

Next, from the theoretical reference values T of the color values of the target and the theoretical value 2 and the theoretical value 3 of the target on which color calibration of the printer is executed, the control section 21 (when executing color verification result estimating program 21a) calculates color difference ΔE2 and color difference ΔE3 each between the theoretical values T and the corresponding theoretical values (S173). The control section 21 calculates the color difference ΔE2 and the color difference ΔE3 for all probabilities of occurrence of the condition change of the printer preset with respect to the reference value of the device variation. Then, the control section 21 compares each of the difference ΔE2 and the difference ΔE3 with ΔE which is the judgment standard, and judges whether the color reproduction accuracy is acceptable or not for each of colors of the judgment items (S174).

Next, the control section 21 (when executing color verification result estimating program 21a) performs an overall judgment from the judgment results for colors of the judgment items (S175).

Next, the control section 21 (when executing color verification result estimating program 21a) judges whether the overall judgment has been performed for all the variation amounts based on probabilities of occurrence of the condition change of the printer preset with respect to the reference value of the device variation (S176). In the case where the overall judgment has not been completed for all the variation amounts, the processing returns to S171, and the similar processing is repeated. In the case where the overall judgment has been completed for all the variation amounts, the control section 21 calculates an estimated acceptance ratio of color verification from the overall judgment result for each of all the variation amounts (S177).

Hereafter, description is given concretely to the processing at S171 to S177. FIGS. 16A to 16D illustrate examples of the judgement results and the estimated acceptance ratio of color verification in the case where the judgment standard is set to ΔE. The column of "Probability with Respect to Center Value (Ref. Value) of All Values of Device Variation" shows probabilities with respect to the reference value on the color gamut increasing side and the color gamut reducing side when the device condition varies from the reference device condition with regard to a color of interest. The range of the probabilities is set to a range of ±49.9% based on the distribution of device variation mentioned above with reference to FIG. 12. In these figures, the judgement results are shown for colors as judgment items, 100% Cyan, 100% Magenta, 100% Yellow, 100% Red, 100% Green, 100% Back, and 100% Black (K); and indicate whether color differences (ΔE1 to ΔE3) between the respective theoretical values (the theoretical color values 1 to the theoretical color values 3) of color values of the target on which color calibration of the printer is executed and the theoretical value (the theoretical reference values T) of color values of the target fall within the ΔE judgment standard, by using OK or NG. FIGS. 16A to 16E illustrate the cases where the judgment standards are ΔE≤3, ΔE≤6, ΔE≤7, and ΔE≤8, respectively.

For example, circle RA in FIG. 15 shows the judgment standard (acceptance range) for the color of Cyan 100%. That is, the center of the circle RA represents the color of 100% Cyan (indicated by CT in FIG. 15) on the target color gamut GT, and the inside of the circle RA corresponds to values fell within the ΔE judgment standard. In the case where colors C1 and C2 corresponding to 100% Cyan belonging to color gamut G1 and color gamut G2 increased/reduced due to device variation fall within the circle RA, the judgment result becomes OK. On the other hand, in the case where colors C1 and C2 corresponding to 100% Cyan belonging to color gamut G1 and color gamut G2 increased/reduced due to device variation fall out of the circle RA, the judgment result becomes NG. In the example illustrated in FIG. 15, in the vicinity of 100% Cyan (CT) of the target, the standard printer's color gamut (GP) is narrower than the target color gamut (GT). Accordingly, in the case where the color gamut is reduced due to device variation, the judgment results tends to become NG.

The column of "Overall Judgment Result" in FIGS. 16A to 16D shows overall judgement results made by judging whether the color reproduction accuracy is acceptable or not in total from the judgement results of plural judgment items for each of "Probabilities with Respect to Center Value (Reference Value) of All Values of Device Variation" mentioned above. If at least one of the judgement results of the plural judgment results becomes NG, the overall judgment result is made to NG. The value of "Estimated Acceptance Ratio" represents the probability that the "overall judgment results" become OK among those for all values of device variation. For example, in the case where the judgment standard in FIG. 16A is as severe as ΔE≤3, the judgment results become OK in the range of from +30% to −20% of the distribution probabilities. Accordingly, the estimated acceptance ratio on color verification becomes 50.0%. Similarly, in the case of the judgment standard ΔE≤6 in FIG. 16B, since the judgment results become OK in the range of from +40% to −35% of the distribution probabilities, the estimated acceptance ratio on color verification becomes 75.0%. In the case of the judgment standard ΔE≤7 in FIG. 16C, since the judgment results become OK in the range of from +45% to −45% of the distribution probabilities, the estimated acceptance ratio on color verification becomes 90.0%. In the case of the judgment standard ΔE≤8 in FIG. 16D, since the judgment results become OK in the range of from +49.9% to −49.9% of the distribution probabilities, the estimated acceptance ratio on color verification becomes 99.8%.

FIG. 17 illustrates an example of the correspondence between the judgment level set as a condition of color verification and the estimated acceptance ratio on color verification calculated with the above technique. A judgment level corresponding to the higher estimated acceptance ratio is the lax judgment level, and, on the other hand, a judgment level corresponding to the lower estimated acceptance ratio is the strict judgment level.

Now, description returns to the flowchart illustrated in FIG. 5. The control section 21 (when executing color verification result estimating program 21a) judges whether the color reproduction accuracy is unacceptable or not, on the basis of the estimated acceptance ratio on color verification (S180). For example, the control section 21 compares the estimated acceptance ratio of color verification defined by the above technique with a predetermined threshold. Then, in the case where the estimated acceptance ratio on color verification is lower than the threshold, the control section 21 judges that the color reproduction accuracy is unacceptance. In this example, the control section 21 judges whether the color reproduction accuracy is unacceptable or not, on the basis of the estimated acceptance ratio on color verification, but may make the judgement on the basis of the judgement results for colors as judgement items or the overall judgement results for distribution probabilities.

Then, the control section 21 (when executing color verification result estimating program 21a) outputs the judgement result as a estimated result of color verification through an output unit such as display section 26 to inform a user about the judgement result. In concrete terms, in the case where the estimated result of color verification indicates acceptable color reproduction accuracy, the control section 21 (when executing color verification result estimating program 21a) informs a user about the result (S190), and registers the conditions and result of color verification and the judgment result into the database (a list of estimated results color verification) with the conditions and the result being associated with each other (S220). On the other hand, in the case where the estimated result of color verification indicates unacceptable color reproduction accuracy, the control section 21 informs a user about the result (S200), sets a color verification prohibition flag which indicates that the conditions of color verification which are currently set makes a result indicating unacceptable color reproduction accuracy and prohibits execution of color verification by using the conditions which are currently set (S210), and registers the conditions and result of color verification and the color verification prohibition flag into the database (the list of estimated results of color verification) with the conditions, the result and the flag being associated with each other (S220).

FIG. 18 illustrates an example of this database (the list of estimated results of color verification). In the database, conditions of color verification (a device type, a paper type, a target, and a judgment level), a judgment result, a verification date, etc. are associated with each other and registered. The registration of such a list of estimated results of color verification enables a user to do the following matters. For example, when a user requests to display the list of estimated results of color verification, and when a user tries to execute color verification with a paper type registered in an unacceptance list of the list of estimated results of color verification, a user can determine whether to executes the color verification or not, with the displayed list of estimated results of color verification.

As described above, the control section 21 creates the printer profile 1 based on color values 1 obtained by measuring colors of a color chart output without color calibration, and the printer profile 2 and printer profile 3 based on color values 2 and color values 3 including the factor of device variation, respectively. The control section 21 calculates theoretical reference values T from color values of a color of the judgement standard (a standard color to be a target of color verification) by using a target profile and further calculates theoretical color values 1, theoretical color values 2 and theoretical color values 3 by using the printer profiles 1 to 3, to obtain an estimated result of color verification on the basis of color difference each between the theoretical reference values T and corresponding one of the theoretical color values 1, theoretical color values 2 and theoretical color values 3. Then, the control section 21 outputs the estimated result to inform a user about the result and register the result in a database. Such estimation can prevent a problem that color verification is executed even if the color verification will make a result indicating an unacceptable color reproduction accuracy, before it is executed.

In the above-mentioned flow, the data of device variation used in the estimation of a result of color verification is memorized beforehand in the storage section 24. However, it is preferable that when the working hours of the image forming apparatus 30 increases (exceeds a predetermined threshold), such data of device variation are updated to the newest data of device variation. The updating of the data of device variation makes the estimation accuracy of a result of color verification higher.

Example 2

Next, with reference to FIG. 19A to FIG. 22, description will be given to a method of estimating a result of color verification, a control device and a non-transitory computer-readable storage medium storing a program for estimating a result of color verification pertaining to Example 2.

In the above-mentioned first example, by informing a user about a judgment result of color verification, excessive execution of color verification is suppressed. Alternatively, by making the judgment level of color verification lax, or by setting the judgment level for each color, colors desired by a user may be reproduced. Then, in the present example, the control device 20 is configured not only to inform a user about the judgement result, but also to allow a user to change the judgement level, whereby color verification is made to be executed efficiently.

In this example, the structure of the control device 20 is the same as that of Example 1 illustrated in FIGS. 3A and 3B. However, the color verification result estimating program 21a (a color verification result estimating section) calculates color differences $\Delta E1$, $\Delta E2$, and $\Delta E3$ each between the theoretical reference values T and corresponding one of the theoretical color values 1, the theoretical color values 2, and the theoretical color values 3, makes a judgement of color verification based on these color differences, and estimates a result of color verification, whether the color reproduction accuracy is acceptable or not. Then, the color verification result estimating program 21a (the color verification result estimating section) outputs the estimated result to inform a user about the result by displaying a screen on which the judgment level and the result of color verification are associated with each other, through a display section 26, prompts a user to change the judgment level of color verification or the judgment standard for each color (receives a setting change of the judgement level of color verification and/or a setting change of the standard value of color verification for each color of interest through the operation section 27), so that a result of color verification indicating an acceptable color reproduction accuracy can be obtained.

Hereinafter, description is given to estimation of a result of color verification at the time of a use of a new type of paper in the image forming apparatus 30. CPU 22 of control section 21 loads control programs memorized in storage section 24 on RAM 23 and executes the control programs, thereby executing the processing of steps shown in the flowchart of FIGS. 19A and 19B.

First, the control section 21 (when executing color verification result estimating program 21a) causes display section 26 to display a setting screen 60 of conditions of color verification as illustrated in FIG. 11, and causes or prompts a user to input conditions of color verification through operation section 27 (input unit such as a mouse and a keyboard) (S300). Then, the control section 21 sets conditions of color verification in accordance with conditions on the screen 60 of conditions of color verification, and stores the conditions of color verification in storage section 24.

Next, control section 21 (when executing print instruction program 21*c*) reads out data of a color chart for creating a printer profile, memorized in the storage section 24, in accordance with instructions given by the color verification result estimating program 21*a*, transmits the data without performing color management to the image forming apparatus 30, and causes the image forming apparatus 30 to output a color chart (S310). The computing device 40 causes color measurement device 50 to measure colors of the color chart, and obtains color measurement data (color values 1). The control section 21 (when executing color verification result estimating program 21*a*) obtains from the computing device 40 the color values 1 (S320). In the case where the color printing system 10 is constituted as illustrated in FIG. 2, the control section 21 (print instruction program 21*c*) transmits the data of a color chart for creating a printer profile memorized in the storage section 24 to the image forming apparatus 30 without performing color management in accordance with instructions given by the color verification result estimating program 21*a*. Successively, the image forming apparatus 30 forms an image of a color chart by using the image forming section 38, measures colors of the image of the color chart by using the color measurement section 39, and obtains color measurement data (color values 1). Then, the control section 21 (when executing color verification result estimating program 21*a*) obtains from the image forming apparatus 30 the color values 1. Herein, it is preferable that the image forming apparatus 30 has executed an apparatus correcting operation, such as color calibration and highest density adjustment before outputting a color chart.

Next, the control section 21 (printer profile creating program 21*b*) creates a printer profile 1 by using the color value 1 obtained at the above step in accordance with instructions of the color verification result estimating program 21*a* (S330). This step is the same as that in FIG. 6 in Example 1.

Next, the control section 21 (when executing printer profile creating program 21*b*) creates printer profile 1 by using the color value 1 obtained at the above steps in accordance with instructions given by the color verification result estimating program 21*a* (S330). This step is the same as that of Example 1 illustrated in FIG. 7.

Next, based on the conditions of color verification set at S300, the control section 21 (when executing color verification result estimating program 21*a*) calculates, by using a predetermined target profile, theoretical values T of color values of the target of color verification necessary for calculating a judgment standard (a standard value which shows a color difference becoming a criterion of judging color reproduction accuracy of color verification) (S340). This step is the same as that of Example 1 illustrated in FIG. 8.

Next, the control section 21 (when executing color verification result estimating program 21*a*) calculates color values 2 and color values 3 corresponding to color values 1 obtained at S320, under the condition that color gamut of the image forming apparatus 30 (printer) is increased or reduced due to a conditional change of the printer, where the color values 2 correspond to an increased color gamut and the color values 3 corresponds to a reduced color gamut. In concrete terms, by using the color values 1 obtained at S320 and data of device variation of the image forming apparatus 30 (printer) memorized beforehand in the storage section 24, the control section 21 defines a variation width of color values corresponding to a probability of a conditional change of the image forming apparatus 30 (printer) and calculates the color values 2 (corresponding to an increased color gamut) and the color values 3 (corresponding to a reduced color gamut) in which the factor of device variation is added into the color values 1. After that, the control section 21 calculates theoretical color values 2 and theoretical color values 3 of the target on which color calibration of a printer is executed (S360). This step is the same as that of Example 1 illustrated in FIG. 9.

Next, the control section 21 (when executing color verification result estimating program 21*a*) judges whether the color reproduction accuracy is acceptable or not by using the theoretical reference values T calculated at S340, the theoretical color values 1 calculated at S350, and the theoretical color values 2 and 3 calculated at S360 (S370). In concrete terms, the control section 21 calculates color differences $\Delta E1$, $\Delta E2$, $\Delta E3$ each representing a difference between theoretical reference vales T of the color values of the target and corresponding one of the theoretical color values 1, theoretical color values 2 and theoretical color values 3 and compares the color differences $\Delta E1$, $\Delta E2$, $\Delta E3$ with a preset judgement standard value to estimate a result of color verification. This step is the same as that of Example 1 illustrated in FIG. 10.

Next, the control section 21 (when executing color verification result estimating program 21*a*) judges whether the color reproduction accuracy is unacceptable or not, on the basis of the estimated acceptance ratio on color verification (S380). Then, the control section 21 outputs the judgement result as a estimated result of color verification through an output unit such as display section 26 to inform a user about the judgement result. In concrete terms, in the case where the estimated result of color verification indicates acceptable color reproduction accuracy, the control section 21 informs a user about the result similarly to that of Example 1 (S390), and registers the conditions and result of color verification and the judgment result into the database with the conditions and the result being associated with each other (S440). On the other hand, in the case where the estimated result of color verification indicates unacceptable color reproduction accuracy, the control section 21 does not inform a user about the result simply but outputs the judgement result and a judgement level with which color verification can effectively work through an output unit such as display section 26 to inform a user about the judgement result and the judgement level (S400). For example, the control section 21 (when executing color verification result estimating program 21*a*) causes the display section 26 to display screen 61 of results of color verification as illustrated in FIG. 20. The screen 61 of results of color verification shows the judgement result of color verification for each judgement level or tolerance of device variation and a recommended judgement level. In this example, the judgement level is set to 'Strict', the corresponding judgement result is 'unacceptable', and the medium judgement level which makes the judgement result 'acceptable' is recommended. A user can set a desired judgement level by referring to the screen.

Subsequently, based on signals from the operation section 27, the control section 21 (when executing color verification result estimating program 21*a*) judges whether a setting change of the judgment level is performed by a user (S410). In the case where a setting change of a judgment level is not performed, the control section 21 sets a color verification inhibition flag which indicates that the conditions of color verification currently set will make the judgement result 'unacceptable' and prohibits execution of color verification by using the conditions of color verification currently set (S420), and registers the conditions and the judgement result of color verification and the color verification inhibition flag in the database with the conditions, result and flag being associated with each other (S440). On the other hand, in the case where a setting change of a judgment level is performed, the control section 21 (color verification result estimating program 21a) changes the judgment level of color verification in accordance with a user's operation (S430), and registers the conditions and the judgement result of color verification in the database (S440).

In the above-mentioned description, the screen 61 of results of color verification shows judgment levels of color verification, corresponding judgement results and a recommended judgement level. However, even if a judgment level is made lax, there is case where the judgment result becomes 'unacceptable'. For example, in FIG. 14 and FIG. 15 provided in Example 1, in the case of a color around which the printer's color gamut GP and the target color gamut GT are separated greatly from each other, even if a judgment level is made lax, a judgment result for the color becomes NG, and also an overall judgment result becomes NG. As a result, although other colors are fully in an acceptance range, the result of color verification becomes 'unacceptable'.

In such a case, the control section 21 may cause the display section 26 to display the screen 62 of judgement results of color verification as illustrated in FIG. 21, so as to allow a user to set the judgment level of color verification in detail. In concrete terms, an item "Custom" is added in the judgment level column on the screen 62 of judgement results of color verification. Then, when a user depresses a button of detailed results ('Details' button), the display section 26 displays screen 63 of details of judgment results as illustrated in FIG. 22. This screen 63 of details of judgment results shows the variation and the judgement standard corresponding to each judgement level for each color, and in the column of 'Judgment Standard', a present setting value and a recommendable setting value of the judgement standard are indicated. Accordingly, with reference to this screen 63 of details of judgment results, a user determines the cause by which the judgment result becomes 'unacceptable'. In this example, the judgement results become 'unacceptable' because, despite the value 'ΔE=7.5' for the lax judgment level for the judgment item K100%, the current setting of the judgment standard is 'ΔE≤5'. In view of that, the judgment standard is changed to the recommendable setting of (ΔE≤8).

In this way, the control section 21 is configured to, when the judgment result of color verification is 'unacceptable', inform a user about the judgement result of color verification and the judgement level by which the color verification can effectively works to prompt a user to change the settings of the judgement level, and further inform a user about the details of the judgement result to prompt a user to change the judgement standard for each color (receive a change of settings of the standard value for each color of interest), rather than simply output the judgement result to inform a user about the judgement result. Thereby, color verification can be executed effectively. For example, in the case where there is a judgment item for white paper and a user wants to execute color verification by using slightly-colored paper in the image forming apparatus 30, the above-described system allow a user to make the judgement level for the white paper lax by the custom settings so as to make the color variation with the desired paper effectively works.

Herein, the present invention should not be limited to the description in the above examples. The constitution and control can be modified appropriately unless the modification deviates from the intention of the present invention.

For example, in the above-mentioned examples, the judgement of color verification is made by using color values. Alternatively, the judgement may be made by using the hue angle. This hue angle h can be calculated by the following formula.

$$h = \arctan(b^*/a^*)/\pi \times 180 \qquad \text{Formula 1}$$

By calculating hue angle h corresponding to each of the theoretical reference values T, theoretical color values 1, theoretical color values 2 and theoretical color values 3 and comparing them, the judgement of color verification can be made.

As other examples, the judgement of color verification may also be made by calculating ΔH which is a comparison parameter of a hue defined by ISO12647-7 and calculated by the following formula.

$$\Delta H = ((\Delta E)^2 - (\Delta L^*)^2 - (\Delta C^*)^2)^{1/2} \qquad \text{Formula 2}$$

Further, in the above-mentioned examples, the control section 21 of the control device 20 causes display section 26 to display the judgement result of color verification on various kinds of screen to inform a user about the result. Alternatively, the control section 21 may inform a user about the result by outputting sound or light through an output unit prepared on the control device 20.

The present invention is applicable to a method of estimating a color verification result, a control device that executes color verification and a non-transitory computer-readable storage medium storing a program to be executed in the control device.

The invention claimed is:

1. A method used by a control device which performs color verification of colors printed by a printer, for estimating a result of the color verification, the color verification being judging of color reproduction accuracy of the printer, the method comprising:
   causing a user to input conditions to be used for the color verification, through an input unit of the control device;
   obtaining a first set of color values which is color measurement data obtained by measurement of a color chart printed by the printer without color management;
   calculating a second set of color values and a third set of color values, wherein the second set of color values and the third set of color values are calculated based on the first set of color values and using data of device variation of the printer which is previously stored, such that calculation of the second set of color values and the third set of color values is performed without an additional printing of the color chart, wherein the second set of color values corresponds to the first set of color values and represents colors to be printed by the printer having a color gamut increased with a conditional change of the printer based on the previously stored data of device variation of the printer, and wherein the third set of color values corresponds to the first set of color values and represents colors to be printed by the printer having a color gamut reduced with a conditional change of the printer based on the previously stored data of device variation of the printer;

creating a first printer-profile, a second printer-profile and a third printer-profile by using the first set of color values, the second set of color values and the third set of color values;

on a basis of the conditions input by the user, calculating theoretical reference values of color values of a target of the color verification, by using a predetermined target profile;

calculating first theoretical color values, second theoretical color values and third theoretical color values from the theoretical reference values by using the first to third printer-profiles;

obtaining an estimated result of the color verification on a basis of comparison between a preset standard value and each of first to third color differences, the first to third color difference each representing a difference between the theoretical reference values and corresponding one of the first theoretical color values, the second theoretical color values and the third theoretical color values; and outputting the estimated result through the output unit of the control device.

2. The method of claim 1, wherein the causing a user to input the conditions includes causing the user to set at least a device type of the printer, a standard color to be used as the target, a paper type and a judgement level of color verification, as the conditions.

3. The method of claim 1,
wherein the calculating the second set of color values and the third set of color values includes:
defining, by using the previously stored data of device variation of the printer, a variation amount of color values corresponding to a probability of occurrence of the conditional change of the printer, and
calculating the second set of color values and the third set of color values by increasing the first set of color values by the variation amount and reducing the first set of color values by the variation amount, respectively.

4. The method of claim 3, wherein:
the calculating the second set of color values and the third set of color values includes:
calculating the second set of color values and the third set of color values for each of plural probabilities of occurrence of conditional changes of the printer, and
the obtaining the estimated result includes:
for each of the plural probabilities, making an overall judgement of plural colors of interest, which are previously set, on a basis of comparison between the standard value and each of the first to third color differences for each of the plural colors of interest, and
estimating whether a result of the color verification indicates acceptable color reproduction accuracy or not, on a basis of results of the overall judgement for the plural probabilities.

5. The method of claim 4, wherein the obtaining the estimated result includes:
calculating an acceptance ratio of the color verification, on a basis of a range of the probabilities for which the results of the overall judgement indicate acceptable color reproduction accuracy, and
estimating whether the result of the color verification indicates acceptable color reproduction accuracy or not, by comparing the acceptance ratio and a predetermined threshold.

6. The method of claim 4, wherein the plural colors of interest are 100% cyan, 100% magenta, 100% yellow, 100% red, 100% green, 100% blue and 100% black.

7. The method of claim 4, wherein the outputting the estimated result includes, if the estimated result indicates acceptable color reproduction accuracy, outputting the estimated result through the output unit and registering the conditions and the estimated result in a database with the conditions and the estimated result being associated with each other.

8. The method of claim 4, wherein the outputting the estimated result includes, if the estimated result indicates unacceptable color reproduction accuracy, outputting the estimated result through the output unit, setting a flag to prohibit execution of color verification using the conditions, and registering the conditions, the estimated result and the flag in a database with the conditions, the estimated result and the flag being associated with each other.

9. The method of claim 8, wherein:
the causing a user to input the conditions includes causing the user to set one of a plurality of judgement levels of color verification, as a condition to be used for the color verification, the plurality of judgement levels being defined according to the standard value, and
the outputting the estimated result includes, if the estimated result indicates unacceptable color reproduction accuracy, outputting the estimated result for each of the plurality of judgement levels through the output unit, and receiving a user's instruction to set another of the plurality of judgement levels as the condition to be used for the color verification, through the input unit.

10. The method of claim 8, wherein the outputting the estimated result includes, if the estimated result indicates unacceptable color reproduction accuracy, outputting the estimated result for each of the colors of interest through the output unit, and receiving a user's instruction to change a setting of the standard value for each of the colors of interest through the input unit.

11. A control device which performs color verification of colors printed by a printer, where the color verification is judging of color reproduction accuracy of the printer, the control device comprising:
an input unit;
an output unit; and
a hardware processor that estimates a result of color verification and performs processing including:
causing a user to input conditions to be used for the color verification, through the input unit,
obtaining a first set of color values which is color measurement data obtained by measurement of a color chart printed by the printer without color management,
calculating a second set of color values and a third set of color values, wherein the second set of color values and the third set of color values are calculated based on the first set of color values and using data of device variation of the printer which is previously stored, such that calculation of the second set of color values and the third set of color values is performed without an additional printing of the color chart, wherein the second set of color values corresponds to the first set of color values and represents colors to be printed by the printer having a color gamut increased with a conditional change of the printer based on the previously stored data of device variation of the printer, and wherein the third set of color values corresponds to the first set of color values and represents colors to be printed by the printer having a color gamut reduced with a conditional change of the printer based on the previously stored data of device variation of the printer, creating a first printer-profile, a second printer-profile and a third printer-profile by using the first set of color values, the second set of color values and the third set of color values, on a basis of the conditions input by the user, calculating theoretical reference values of color values of a target of the color verification, by using a predetermined target profile, calculating first theoretical color values, second theoretical color values and third theoretical color values from the theoretical reference values by using the first to third printer-profiles, obtaining an estimated result of the color verification on a basis of comparison between a preset standard value and each of first to third color differences, the first to third color difference each representing a difference between the theoretical reference values and corresponding one of the first theoretical color values, the second theoretical color values and the third theoretical color values, and outputting the estimated result through the output unit.

12. The control device of claim 11, wherein, in causing the user to input the conditions, the hardware processor causes the user to set at least a device type of the printer, a standard color to be used as the target, a paper type and a judgement level of color verification, as the conditions.

13. The control device of claim 11,
wherein, in calculating the second set of color values and the third set of color values, the hardware processor:
defines, by using the previously stored data of device variation of the printer, a variation amount of color values corresponding to a probability of occurrence of the conditional change of the printer, and
calculates the second set of color values and the third set of color values by increasing the first set of color values by the variation amount and reducing the first set of color values by the variation amount, respectively.

14. The control device of claim 13, wherein:
in calculating the second set of color values and the third set of color values, the hardware processor:
calculates the second set of color values and the third set of color values for each of plural probabilities of occurrence of conditional changes of the printer, and
in obtaining the estimated result, the hardware processor:
makes, for each of the plural probabilities, an overall judgement of plural colors of interest, which are previously set, on a basis of comparison between the standard value and each of the first to third color differences for each of the plural colors of interest, and
estimates whether a result of the color verification indicates acceptable color reproduction accuracy or not, on a basis of results of the overall judgement for the plural probabilities.

15. The control device of claim 14,
wherein, in obtaining the estimated result, the hardware processor:
calculates an acceptance ratio of the color verification, on a basis of a range of the probabilities for which the results of the overall judgement indicate acceptable color reproduction accuracy, and
estimates whether the result of the color verification indicates acceptable color reproduction accuracy or not, by comparing the acceptance ratio and a predetermined threshold.

16. The control device of claim 14, wherein the plural colors of interest are 100% cyan, 100% magenta, 100% yellow, 100% red, 100% green, 100% blue and 100% black.

17. The control device of claim 14,
wherein, if the estimated result indicates acceptable color reproduction accuracy, the hardware processor:
outputs the estimated result through the output unit, and
registers the conditions and the estimated result in a database with the conditions and the estimated result being associated with each other.

18. The control device of claim 14,
wherein, if the estimated result indicates unacceptable color reproduction accuracy, the hardware processor:
outputs the estimated result through the output unit,
sets a flag to prohibit execution of color verification using the conditions, and
registers the conditions, the estimated result and the flag in a database with the conditions, the estimated result and the flag being associated with each other.

19. The control device of claim 18,
wherein, in causing the user to input the conditions, the hardware processor:
causes the user to set one of a plurality of judgement levels of color verification, as a condition to be used for the color verification, the plurality of judgement levels being defined according to the standard value, and
if the estimated result indicates unacceptable color reproduction accuracy, the hardware processor:
outputs the estimated result for each of the plurality of judgement levels through the output unit, and
receives a user's instruction to set another of the plurality of judgement levels as the condition to be used for the color verification, through the input unit.

20. The control device of claim 18,
wherein, if the estimated result indicates unacceptable color reproduction accuracy, the hardware processor:
outputs the estimated result for each of the colors of interest through the output unit, and
receives a user's instruction to change a setting of the standard value for each of the colors of interest through the input unit.

21. A non-transitory computer-readable storage medium storing a program to be executed by a control device which performs color verification of colors printed by a printer, for estimating a result of the color verification, the color verification being judging of color reproduction accuracy of the printer, the program, when executed by a processor of the control device, causing the control device to perform processing comprising:
causing a user to input conditions to be used for the color verification, through an input unit of the control device;
obtaining a first set of color values which is color measurement data obtained by measurement of a color chart printed by the printer without color management;
calculating a second set of color values and a third set of color values, wherein the second set of color values and the third set of color values are calculated based on the first set of color values and using data of device variation of the printer which is previously stored, such that calculation of the second set of color values and the third set of color values is performed without an additional printing of the color chart, wherein the second set of color values corresponds to the first set of color values and represents colors to be printed by the printer having a color gamut increased with a conditional change of the printer based on the previously stored data of device variation of the printer, and wherein the third set of color values corresponds to the first set of color values and represents colors to be printed by the printer having a color gamut reduced with a conditional change of the printer based on the previously stored data of device variation of the printer;

creating a first printer-profile, a second printer-profile and a third printer-profile by using the first set of color values, the second set of color values and the third set of color values;

on a basis of the conditions input by the user, calculating theoretical reference values of color values of a target of the color verification, by using a predetermined target profile;

calculating first theoretical color values, second theoretical color values and third theoretical color values from the theoretical reference values by using the first to third printer-profiles;

obtaining an estimated result of the color verification on a basis of comparison between a preset standard value and each of first to third color differences, the first to third color difference each representing a difference between the theoretical reference values and corresponding one of the first theoretical color values, the second theoretical color values and the third theoretical color values; and outputting the estimated result through the output unit of the control device.

* * * * *